United States Patent
Zhu et al.

(10) Patent No.: US 12,166,296 B2
(45) Date of Patent: Dec. 10, 2024

(54) ANTENNA FOR WEARABLE ELECTRONIC DEVICES

(71) Applicant: Facebook Technologies, LLC, Menlo Park, CA (US)

(72) Inventors: Jiang Zhu, Cupertino, CA (US); Wenjing Su, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 135 days.

(21) Appl. No.: 17/752,588

(22) Filed: May 24, 2022

(65) Prior Publication Data

US 2023/0411856 A1    Dec. 21, 2023

(51) Int. Cl.
*H01Q 9/16* (2006.01)
*H01Q 1/27* (2006.01)

(52) U.S. Cl.
CPC .............. *H01Q 9/16* (2013.01); *H01Q 1/273* (2013.01)

(58) Field of Classification Search
CPC ................................. H01Q 9/16; H01Q 1/273
See application file for complete search history.

(56) References Cited

U.S. PATENT DOCUMENTS

| 6,675,461 | B1 | 1/2004 | Rowson et al. | |
| 6,677,915 | B1* | 1/2004 | Yablonovitch | H01Q 13/22 343/744 |
| 2007/0273588 | A1* | 11/2007 | Kim | H01Q 9/0407 343/700 MS |

FOREIGN PATENT DOCUMENTS

| JP | 2021106347 A | 7/2021 |
| WO | 2009031700 A1 | 3/2009 |

OTHER PUBLICATIONS

International Search Report and Written Opinion for International Application No. PCT/US2023/023225, mailed Sep. 5, 2023, 9 pages.

* cited by examiner

*Primary Examiner* — Dieu Hien T Duong
(74) *Attorney, Agent, or Firm* — Greenberg Traurig, LLP

(57) ABSTRACT

The antenna architectures disclosed herein may include a magnetic dipole antenna that includes a radiating element formed in an open loop that includes at least first and second portions that are positioned opposite each other. The magnetic dipole antenna may further include an electrically conductive via connecting the first and second opposing portions of the radiating element. The magnetic dipole antenna may further include an antenna feed disposed within the electrically conductive via. The first portion of the radiating element may be shorter in length than the second, opposite portion of the radiating element, and the difference in length between the first and second portions of the radiating element may form a capacitive gap across the radiating element. Various other systems, apparatuses, wearable electronic devices, and methods of manufacturing are also disclosed.

20 Claims, 24 Drawing Sheets

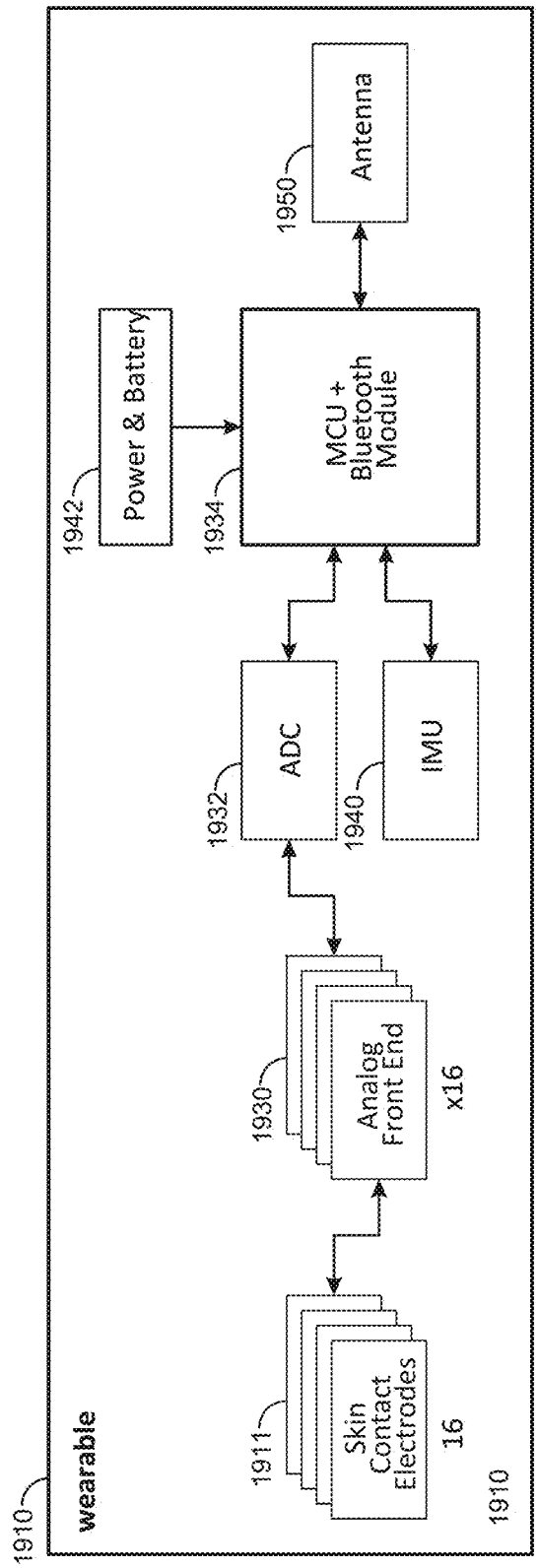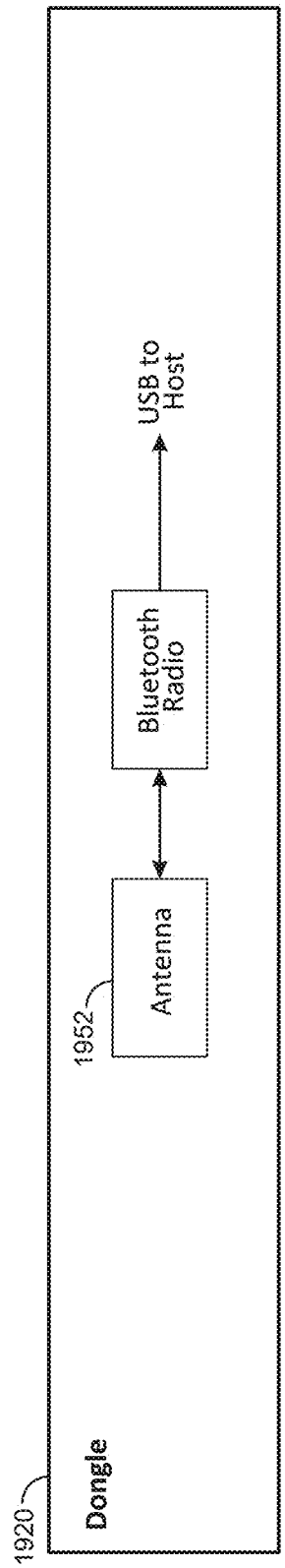
FIG. 19A
FIG. 19B

ANTENNA FOR WEARABLE ELECTRONIC DEVICES

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 19A and 19B are illustrations of an exemplary schematic diagram with internal components of a wearable system.

Figure 1A:
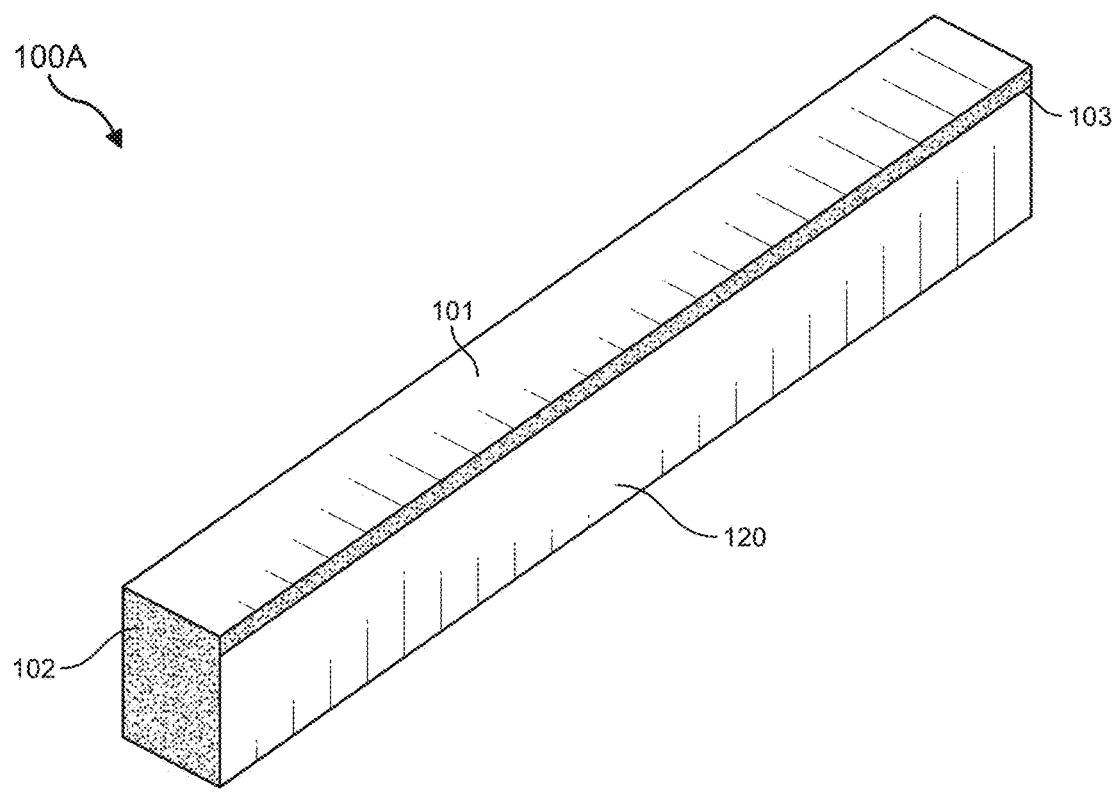
FIGS. 1A & 1B illustrate exemplary embodiments of a magnetic dipole antenna.
Figure 1B:
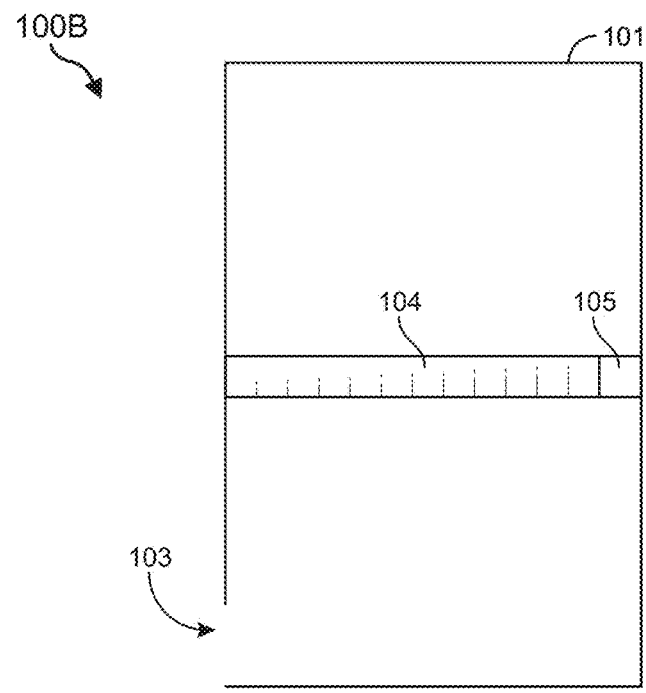

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to an improved antenna architecture for use in mobile electronic devices. The improved antenna architecture may include magnetic dipole antennas that may exhibit decreased directivity and, as such, may operate more efficiently in cross-body implementations. Other antenna architectures used for communication in mobile electronic devices may include electric dipole antennas. Electric dipole antennas are often used as WiFi or Bluetooth antennas. These antennas may be used for communication between virtual reality head-mounted displays (HMDs) and virtual reality (VR) handheld controllers. The frequency bands used by WiFi, Bluetooth and similar electric dipole antennas, however, are often highly saturated and thus prone to interference. As such, the electric dipole antennas may function adequately when VR controllers or other mobile devices are positioned in front of the antenna (e.g., in an HMD), but may function poorly or not at all when the VR controllers or other devices are positioned behind the antenna (and potentially behind the user of the HMD).

In contrast, the embodiments described herein may manufacture, create, or otherwise provide magnetic dipole antennas (e.g., ultrawideband (UWB) magnetic dipole antennas). These magnetic dipole antennas may provide a reduction in directivity and may thus operate more efficiently in an omnidirectional fashion. This reduction in directivity may provide a higher level of conducted power, which may create a stronger radio frequency (RF) link between the magnetic dipole UWB antennas described herein and the peripheral devices with which they are communicating (e.g., VR controllers). This reduction in directivity may also specifically improve the strength of RF connections to peripheral devices that behind the antenna or behind the user.

Indeed, the magnetic dipole (e.g., UWB) antennas described herein may include a structure that provides a conductive material wrapped or formed around a substrate (e.g., a rectangular-shaped substrate). The conductive material may not wrap entirely around the substrate, but may leave a gap or a slot between one side of the antenna and the other side of the antenna. In the embodiments herein, this slot may act as a capacitor between the two ends of the conductive material that are separated by the substrate. The slot may create a magnetic field in the magnetic dipole antenna that may provide an omnidirectional pattern of radiation. This omnidirectional pattern of radiation may exhibit less directivity than that of an electric dipole antenna. The magnetic dipole antenna described herein may be fed by an electric via that electrically connects two opposing sides of the antenna. The electric via may include an antenna feed with various antenna feed components including impedance matching circuits, amplifiers, filters, tuners, etc.

Additionally, the resulting magnetic dipole antenna structure may be manufactured in a form factor that is smaller than that of an electric dipole antenna and, as such, may be placed much closer to printed circuit boards (PCBs), thermal sheets, or other components that may cause interference in highly directional electric antennas. The embodiments described above will be explained in greater detail below with regard to FIGS. 1A-19B.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1A illustrates an embodiment 100A in which a magnetic dipole antenna 101 may be provided. The magnetic dipole antenna 101 may include features or characteristics that decrease directivity and may provide improved efficiency and performance when placed near metallic structures such as PCBs or thermal sheets. Indeed, the embodiments described herein may provide reduced antenna radiation directivity while maintaining the antenna's transmission and reception efficiency.

In cases where the magnetic dipole antenna 101 is implemented in a VR HMD, for example, or other wearable device, the magnetic dipole antenna may need to operate below a specified effective isotropic radiated power (EIRP) while still providing enough efficiency and power to communicate with devices that are potentially behind the wearer of the device. The magnetic dipole antenna 101 of FIG. 1A may include a radiating element formed in an open loop that includes different portions of different dimensions. As shown in embodiment 100B of FIG. 1B, at least two of these portions may be connected via an electrically conductive via 104. In some cases, these two connected portions may oppose each other on the magnetic dipole antenna 101. The electrically conductive via 104 may also include an antenna feed 105 disposed therein to provide signals to the antenna or receive signals from the antenna.

As noted above, the antenna feed 105 may include impedance matching circuits, amplifiers, tuners, filters, signal processors, or other attendant componentry. In different implementations, the various portions of the radiating element may be shorter or longer in length when compared to each other. Thus, in FIGS. 1A and 1B, for example, a shorter side of the magnetic dipole antenna 101 may leave a gap 103 between two portions of the radiating element. This gap 103 across the radiating element may form a capacitive link between two portions of the antenna. The interior portion of the magnetic dipole antenna 101 may include a substrate 102. This substrate may include non-conductive materials (e.g., composite electrically insulating materials) or may simply include air or other gas. The electrically conductive via 104 may travel through the substrate 102 when connecting the two sides of the magnetic dipole antenna 101 and may connect at attachment point 120.

Figure 2A:
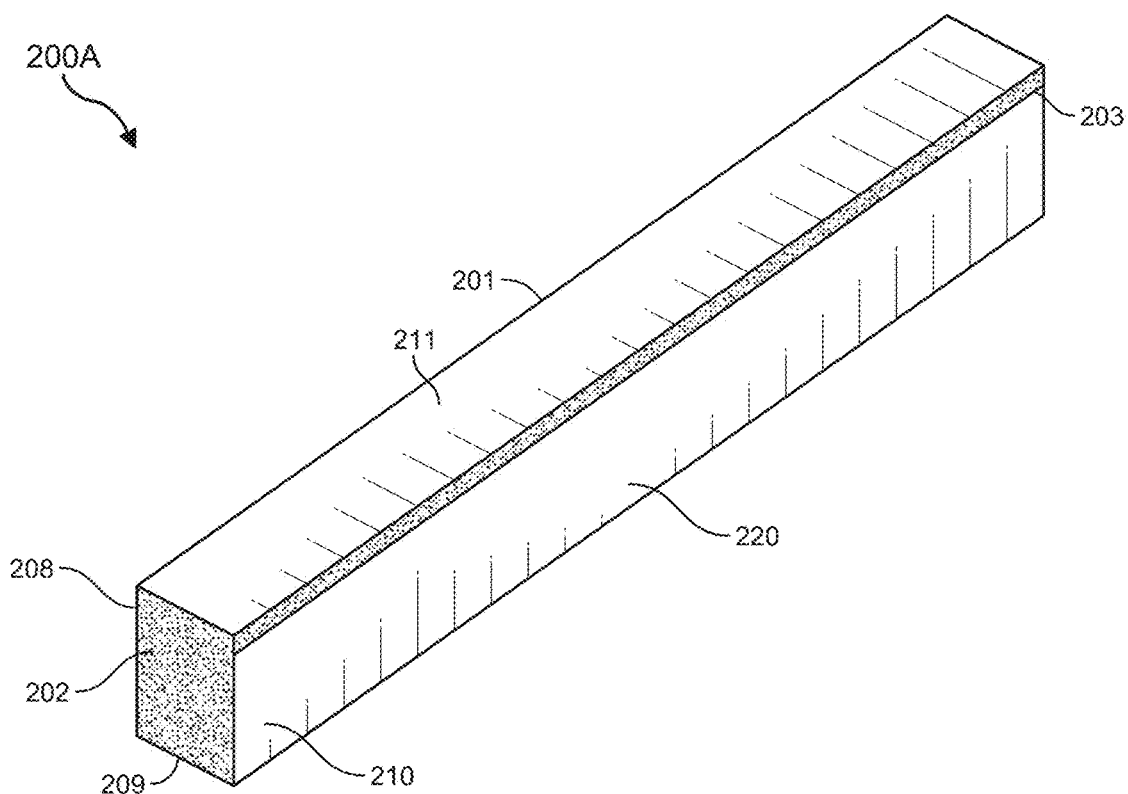
FIGS. 2A & 2B illustrate alternative exemplary embodiments of a magnetic dipole antenna.
Figure 2B:
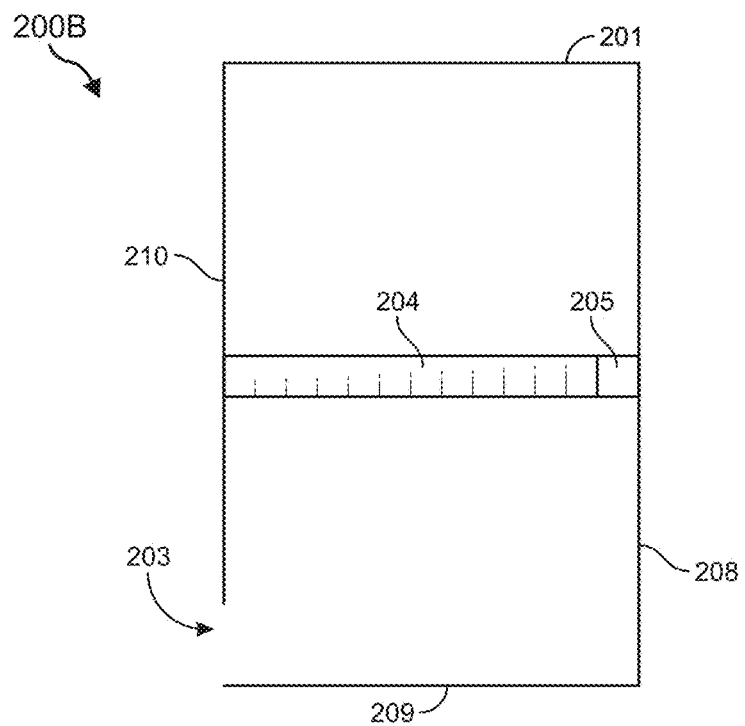

FIGS. 2A & 2B illustrate embodiments 200A/200B that may be similar to or the same as those in FIGS. 1A/1B. However, in embodiments 200A/200B, example dimensions are shown for each side. For example, the height of the magnetic dipole antenna 201 may be 3 mm, while the length may be 20 mm and the width may be 2 mm. Other heights, lengths, and widths are possible. Moreover, different ratios are also possible. In the embodiments herein, the magnetic dipole antenna 201 is shown as a rectangle. That said, the magnetic dipole antenna 201 may be formed in substantially any shape as long as a gap between portions (e.g., gap 203) is provided. In embodiment 200A, the magnetic dipole antenna 201 may include four portions or four sides: a top side 211, a bottom side 209, and two side portions 208 and 210. The side portion 210 may be shorter than the side portion 208, leaving a gap 203 between the top portion 211 and the side portion 210. In this embodiment, side portion 208 may be connected to side portion 210 with an electrically conductive via that connects at point 220.

Indeed, as shown in the electrical diagram 200B of FIG. 2B, side portion 208 may be connected through an antenna feed 205 and a conductive via 204 to the opposite side portion 210. The difference in length between side portion 210 and side portion 208 may result in a gap 203 between side portion 210 and bottom side portion 209. In this embodiment, the gap may be 0.3 mm. Other gap sizes may be used, including gaps that are larger or smaller than 0.3 mm (e.g., 0.1 mm, 0.2 mm, 0.4 mm, 0.5 mm, 0.75 mm, 1 mm, etc.). Different gap sizes may change the capacitance of the gap and as such, may alter the radiation pattern of the magnetic dipole antenna 201.

Figure 3A:
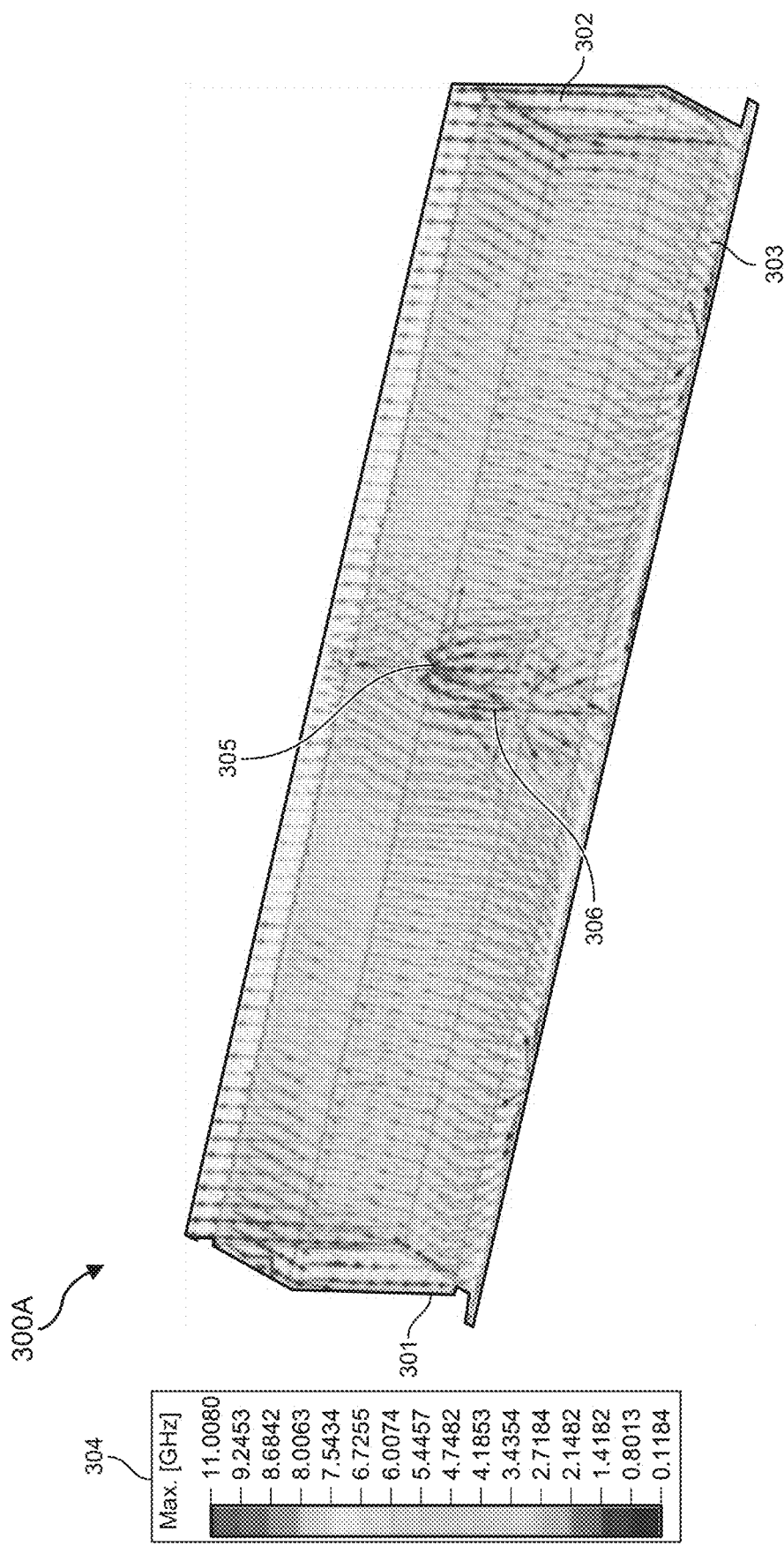
FIGS. 3A-3C illustrate various exemplary embodiments of antenna performance indicators for exemplary magnetic dipole antenna architectures.

Embodiment 300A of FIG. 3A, for example, illustrates an example radiation flow around a magnetic dipole antenna 301. The magnetic dipole antenna 301 may be of a similar shape and design as the magnetic dipole antenna 201 of FIG. 2A. The magnetic dipole antenna 301 may also have a capacitive gap 303 and multiple radiating side portions positioned around a substrate 302. The magnetic dipole antenna 301 may include an electrically conductive via between points 305 and 306. An antenna feed may be disposed at point 305 on the electrically conductive via. As can be seen by the arrows surrounding the magnetic dipole antenna 301, electrical current may flow around the various portions of the radiating element in a generally counterclockwise manner. The radiations may be vertically polarized relative to the length of the magnetic dipole antenna 301. Moreover, as noted in the key 304, different levels of magnetic field strength may be indicated by arrows having different dots, dashes, or dots and dashes. Thus, some portions of the magnetic dipole antenna 301 (such as the ends) may have a higher magnetic field strength, while middle and lower portions may include a lower magnetic field strength.

Figure 3B:
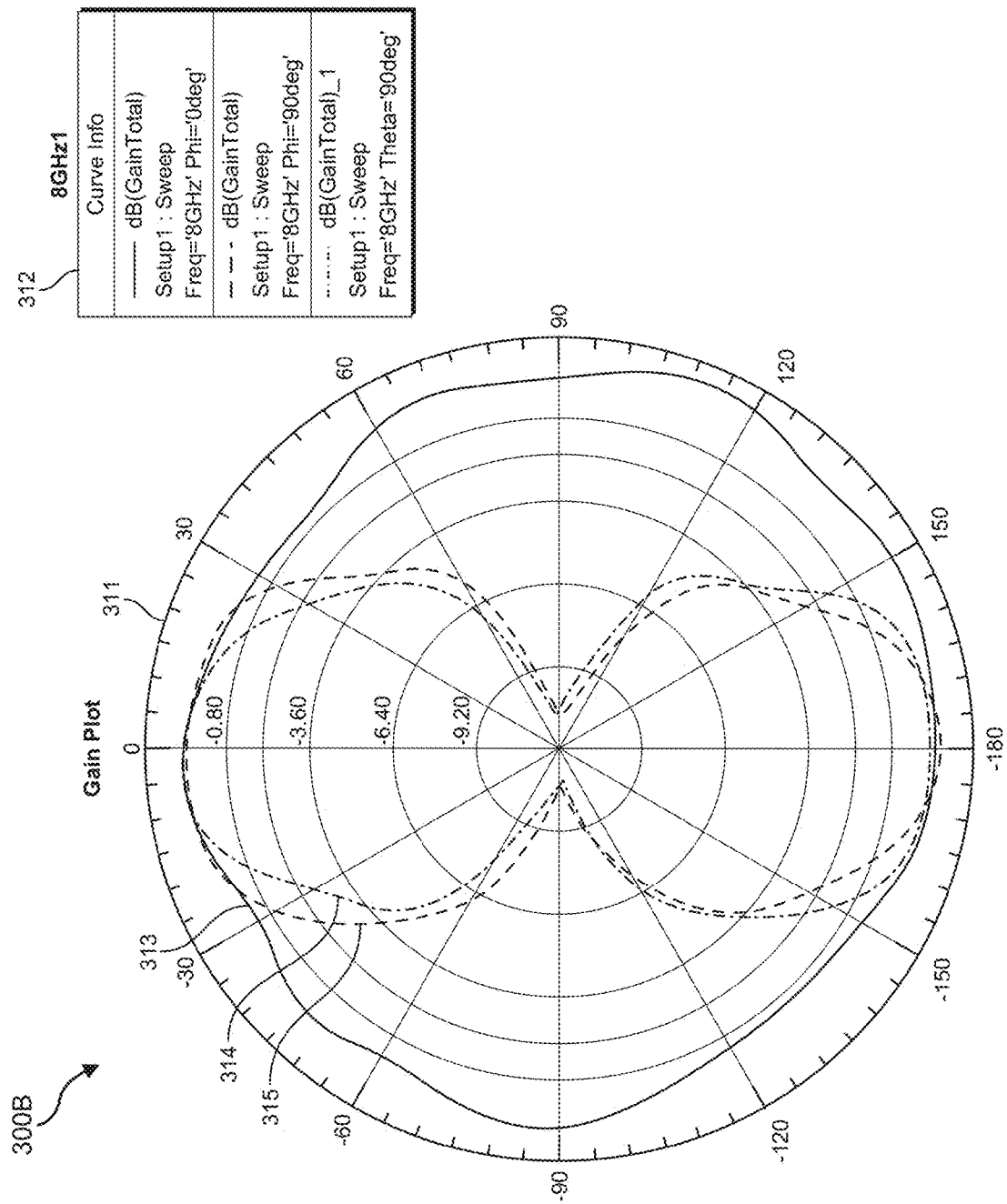
Figure 3C:
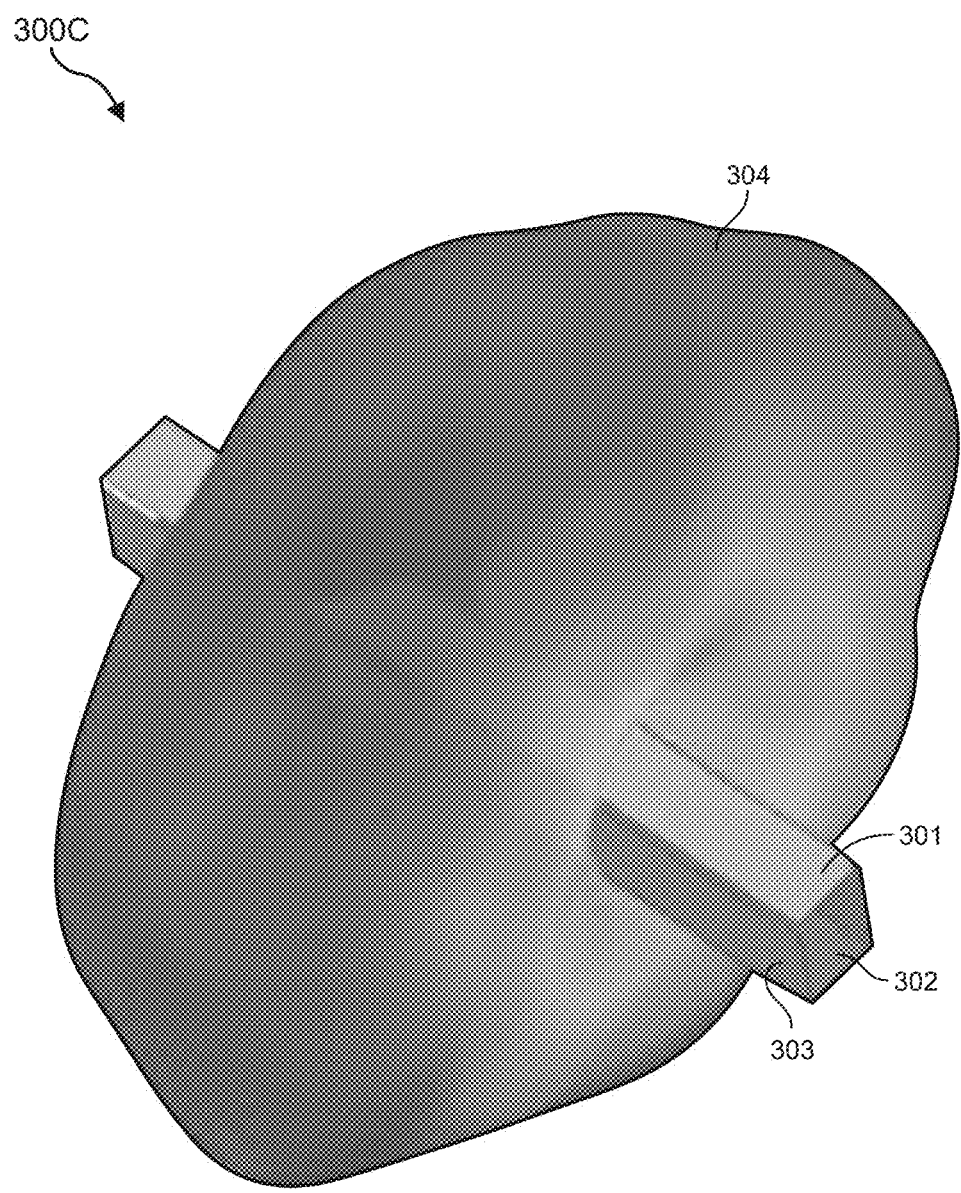

Embodiments 300B of FIG. 3B illustrates an example gain plot 311 of a magnetic dipole antenna 301 in operation. In some cases, the magnetic dipole antenna 301 may be configured to operate at or near 8 GHz. As indicated by key 312, the gain plot 311 illustrates example gain levels for an operating magnetic dipole antenna 301 in different phases, as shown in 313, 314, and 315. Embodiment 300C of FIG. 3C illustrates a radiation pattern 315 that is similar to or the same as 313 on the gain plot 311. The radiation pattern 313 may result from operating the magnetic dipole antenna 301 at a given frequency. As noted above, the magnetic dipole antenna 301 may include a capacitive gap 303 and a substrate 302 around which the radiating elements of the magnetic dipole antenna 301 are formed (the radiating elements are formed around air in this case). As can be seen, the radiation pattern may radiate in a substantially omnidirectional (non-directed) pattern. The magnetic dipole antenna 301 may thus provide reduced directionality when compared to electric dipole antennas. This reduced directionality may allow the magnetic dipole antenna 301 to function in embodiments where total radiated power plus directivity must be less than an EIRP limit, but must be large enough to operate through a user's body or through surrounding PCBs, thermal sheets, or electrical components.

Figure 4:
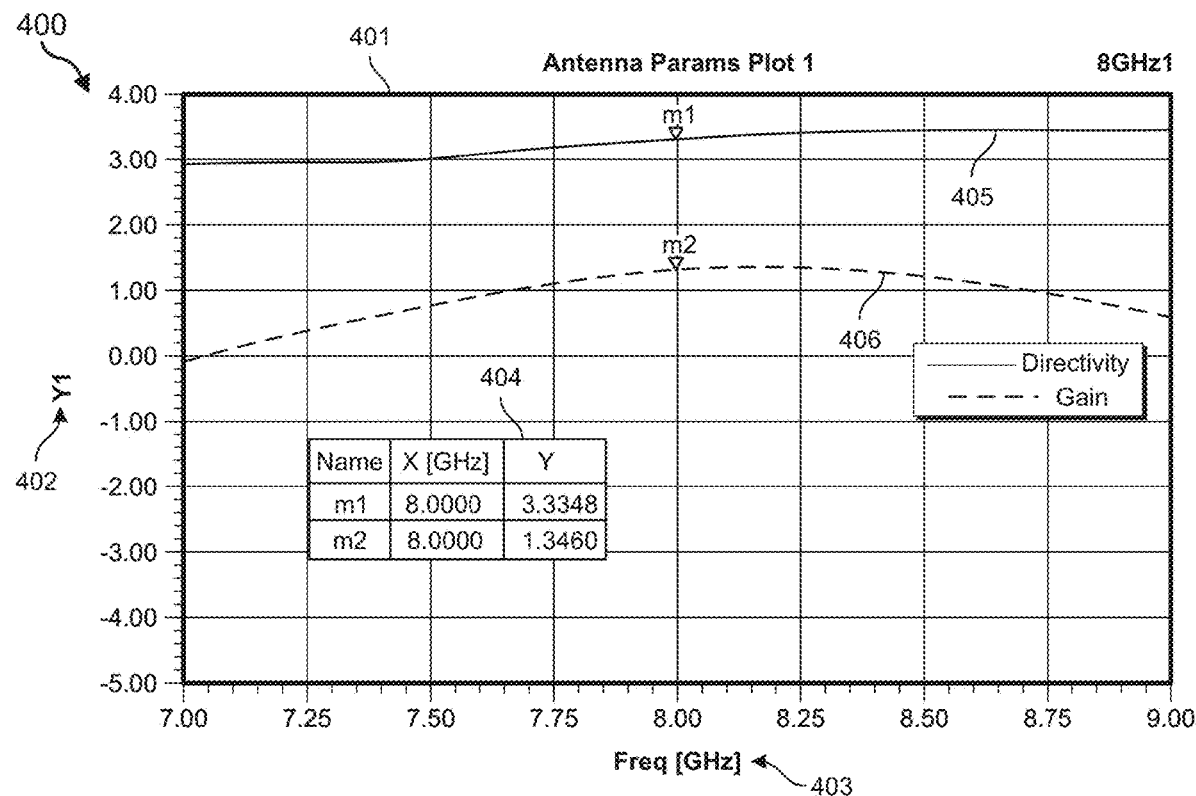
FIG. 4 illustrates a chart that plots directivity and gain for a magnetic dipole antenna.

FIG. 4 provides an embodiment 400 with a chart 401 that includes plotted data. The plotted data may represent directivity 405 over different frequencies 403 as well as gain over different frequencies (see, e.g., key 404). The directivity 405 and gain 406 may rise or fall on the y-axis 402 based on which frequency is being used on the antenna. The chart 401 may represent antenna parameters for the magnetic dipole antenna 301 of FIG. 3A. These plotted data points may thus indicate that the optimal operating range for the magnetic dipole antenna 301 of FIG. 3A may be around 8 GHz. At this range, the magnetic dipole antenna 301 may not interfere with other Bluetooth or WiFi devices or controllers. Moreover, at these frequencies, the magnetic dipole antenna 301 may enable a robust cross-body link to controllers or other peripheral devices that are behind the user. Still further, at these frequencies, the magnetic dipole antenna 301 may provide sufficiently low directivity to assist in forming the cross-body link and functioning with devices that are to the side of or behind the user.

Figure 5:
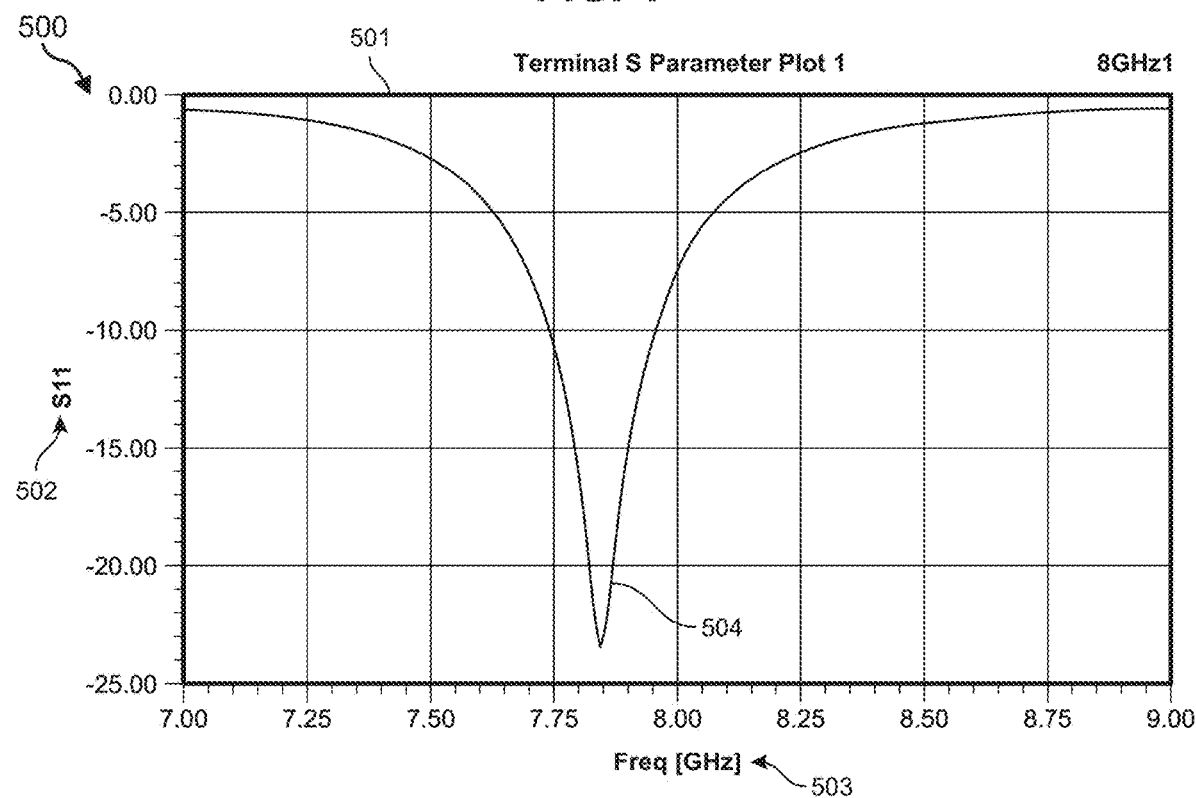
FIG. 5 illustrates a chart that plots a scattering parameter for a magnetic dipole antenna.

Embodiment 500 of FIG. 5 also includes a chart 501 with plotted data 504. This plotted data 504 may also correspond to the magnetic dipole antenna 301 of FIG. 3A. The chart 501 may show S11 antenna return loss on the y-axis 502, and may show that return loss at various frequencies along the x-axis 503. As can be seen, the antenna return loss may take a sharp dip at approximately 7.8 GHz. This reduction in antenna return loss may allow the magnetic dipole antenna 301 to work particularly efficiently at frequencies between 7.75 and 8.0 GHz. Accordingly, as noted above, the magnetic dipole antenna 301 may exhibit high directivity, high gain, and low return loss at frequencies in the 8 GHz range. Because this frequency range provides many benefits over the more saturated, lower frequency ranges (e.g., 2.4-5 GHz), the magnetic dipole antenna 301 may be used for communication between local devices including between virtual reality HMDs and virtual reality controllers, or between smartwatches and internet of things (IoT) devices, or between artificial reality glasses and smartphones, etc.

Figure 6A:
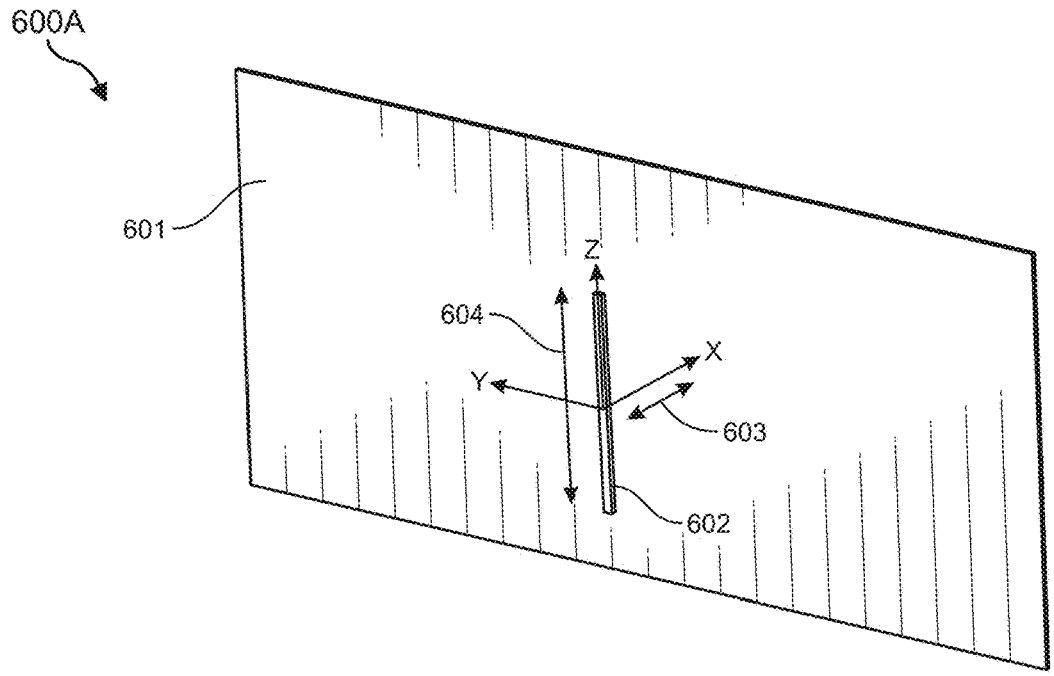
FIGS. 6A & 6B illustrate respective embodiments of electric and magnetic dipole antenna implementations.
Figure 6B:
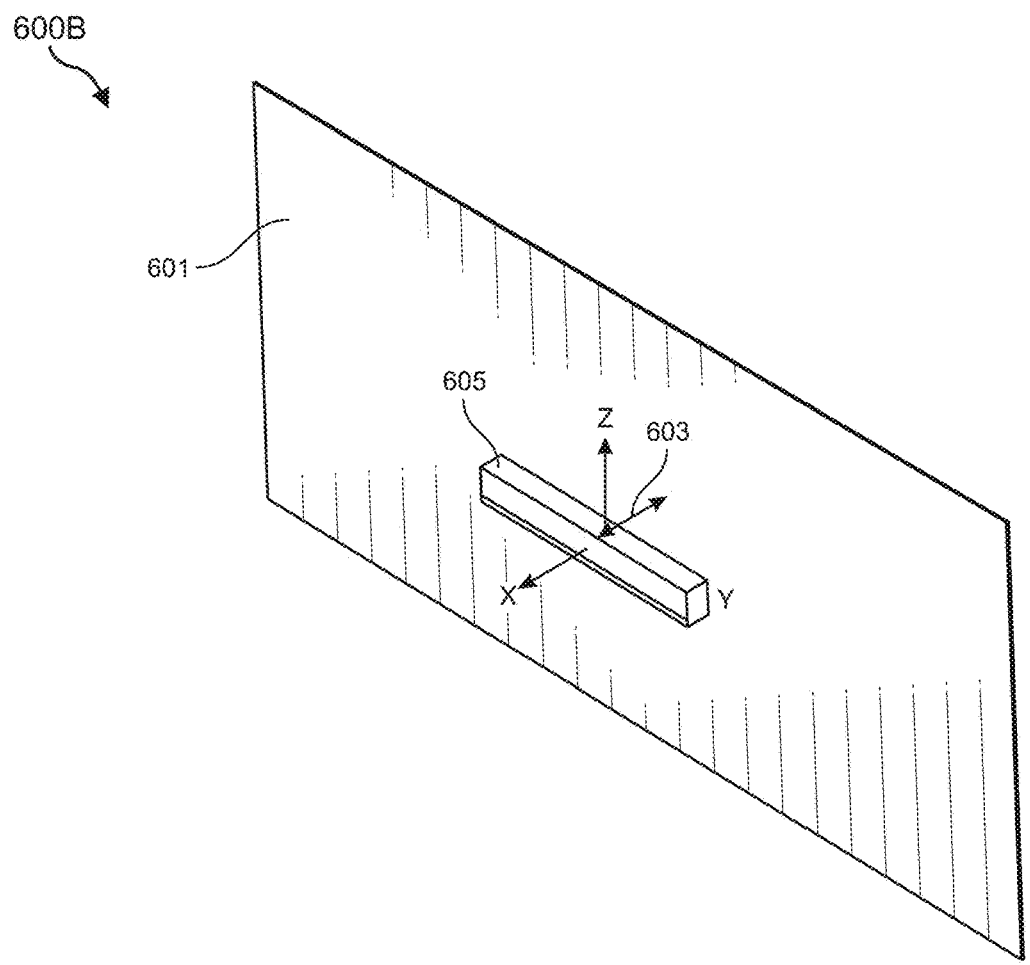

FIGS. 6A and 6B illustrate embodiments 600A/600B in which different types of antennas are shown next to metal sheets. For instance, in embodiment 600A of FIG. 6A, an electric dipole antenna 602 is shown as being a specified distance away from the metal sheet 601. The distance (d) is a minimum specified distance that the electric dipole antenna 602 needs to be able to operate with a minimum level of efficiency. Indeed, as the electric dipole antenna 602 is moved closer to the metal sheet 601 (or PCB, or thermal sheet, or other electronic components that may form an electrical shield), the electric dipole antenna loses efficiency and, indeed, loses its ability to receive and/or transmit signals. Thus, in order to operate properly, a minimum distance (d) must be kept between the electric dipole antenna 602 and the metal sheet 601. The distance (d) may be in the x direction (603), the y direction (604), or potentially the z direction along the z-axis.

In contrast, in embodiment 600B of FIG. 6B, the magnetic dipole antenna 605 may be positioned immediately next to the metal sheet 601. The distance (d) between the magnetic dipole antenna 605 and the metal sheet 601 (or PCB, thermal sheet, etc.), may be 0 mm. Because the design of the magnetic dipole antenna 605 (which may be the same as 101 of FIG. 1A or 301 of FIG. 3A) provides reduced directivity and reduced antenna return loss, the magnetic dipole antenna 605 may function properly and with a minimum level of efficiency even when placed immediately next to an interference source such as metal sheet 601. The metal sheet 601 may be substantially any shape or size. Thus, while some cases may implement a 50 mm×100 mm rectangle, it will be recognized that the metal sheet 601 may be larger or smaller, or may be formed in different shapes, or may comprise multiple smaller components or pieces. Allowing the magnetic dipole antenna 605 to be placed immediately next to PCBs, thermal sheets, or other potentially interfering components allows mobile device designers more freedom in where the magnetic dipole antenna 605 is placed in a given device and ensures that the magnetic dipole antenna will work regardless of where it is placed within the mobile device.

Figure 7A:
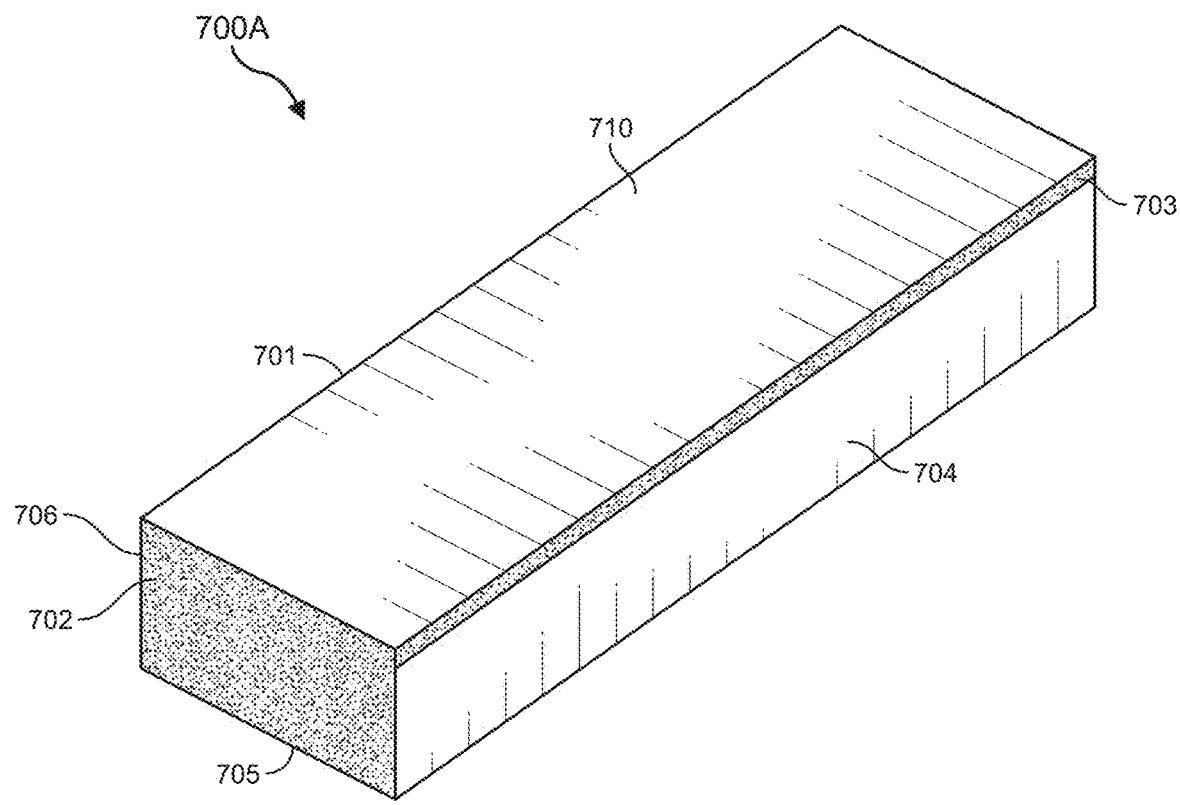
FIGS. 7A-7D illustrate alternative exemplary embodiments of a magnetic dipole antenna, including performance indicators of such an antenna.
Figure 7B:
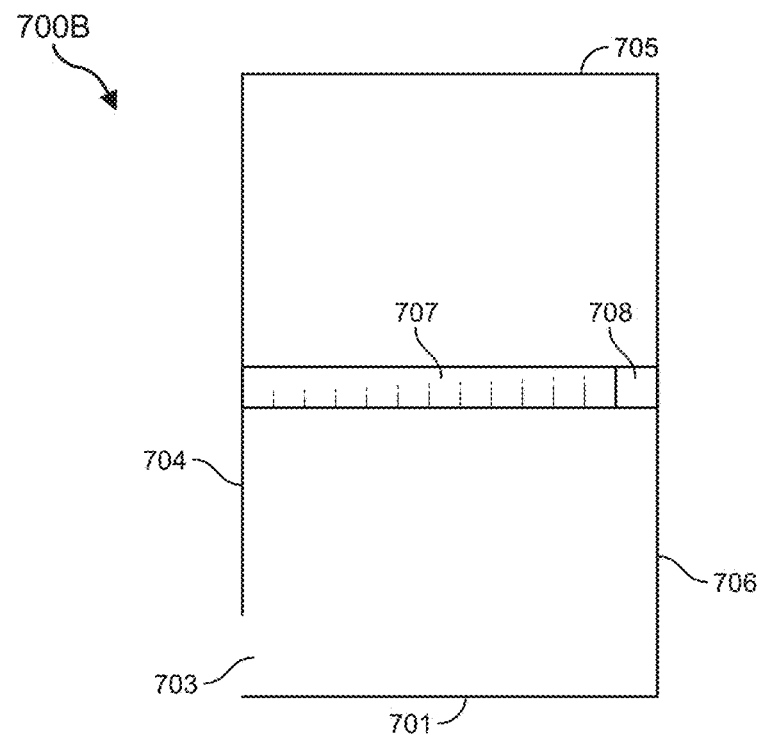
Figure 7C:
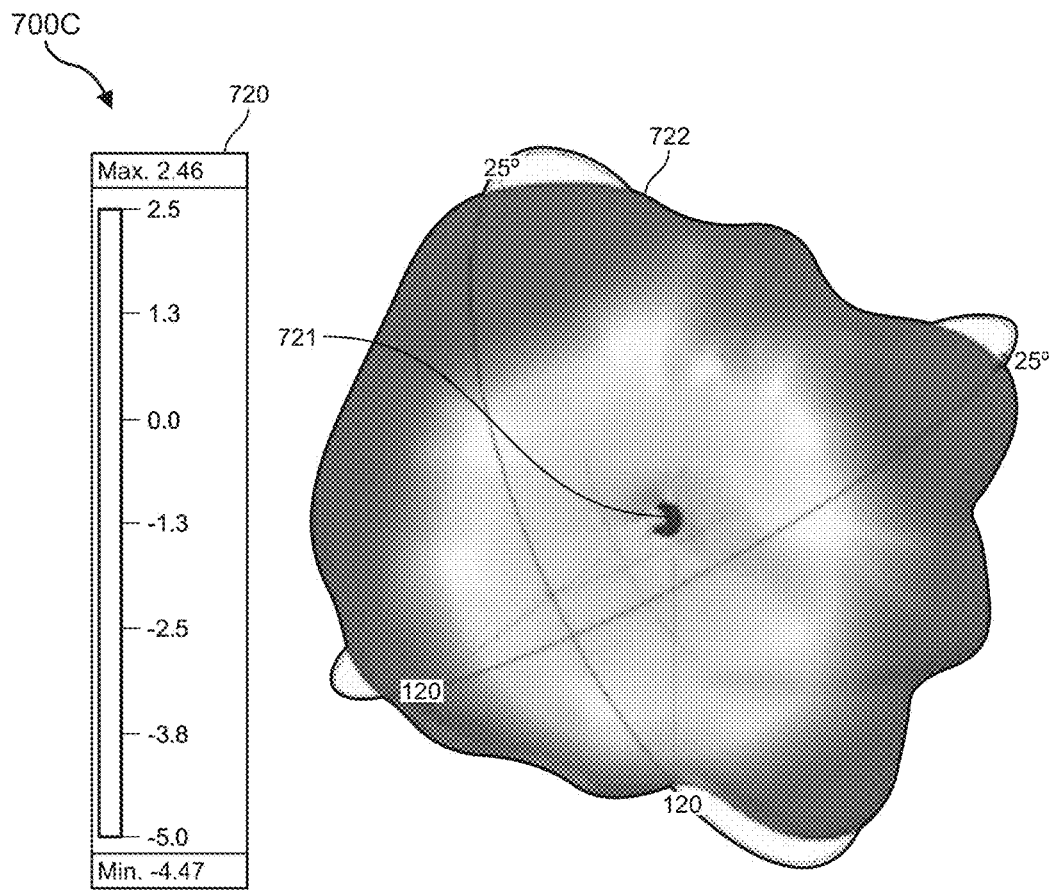
Figure 7D:
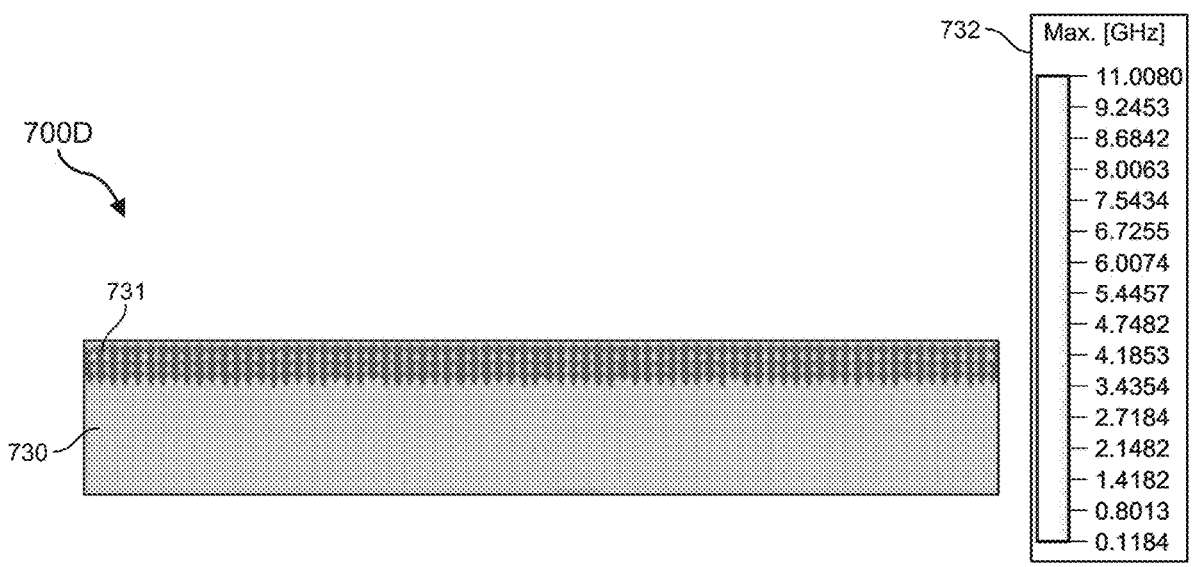

FIGS. 7A and 7B illustrate embodiments 700A/700B of a magnetic dipole antenna 701 that may include multiple radiating portions: 704, 705, 706, and 710. In contrast to magnetic dipole antenna 201 of FIG. 2A, the magnetic dipole antenna 701 may include a capacitive gap 703 on a shorter side of the radiating element. For instance, the magnetic dipole antenna 701 may have a length of, for example, 12 mm, a width of 3.6 mm, and a height of 2 mm (other dimensions are also possible). In this embodiment, the back side portion 706 may be taller than the front side portion 704. This may create a capacitive gap 703 between the top portion 710 and the front side portion 704. Embodiment 700B of FIG. 7B illustrates that this capacitive gap 703 may be, for example, 0.45 mm. The shorter front side portion 704 of the radiating element may be conductively linked to a longer side portion 706 via an electrically conductive via 707. As in the examples above, the electrically conductive via 707 may include an antenna feed 708 with its accompanying components.

By moving the capacitive gap 703 to a shorter side of the rectangular magnetic dipole antenna 701, as opposed to a longer side (as in 201 of FIG. 2A), the magnetic dipole antenna 701 may behave differently (i.e., the antenna may exhibit different performance parameters). As shown in embodiment 700C of FIG. 7C, for example, the radiation pattern 722 may be more efficient in certain directions, as indicated by the shading patterns outlined in the key 720. Moreover, the magnetic dipole antenna 701 of FIG. 7A may exhibit a strong vertical field at the capacitive gap as indicated in embodiment 700D of FIG. 7D by the shaded indicators 731 of chart 730 showing, per the key 732, a high level of radiated energy across the vertical field. This high level of radiated energy across a vertical field at the gap may improve cross-body links, allowing the magnetic dipole antenna 701 to be implemented in scenarios where the antenna is interacting with devices to the side of and/or behind the position of the antenna.

Figure 8A:
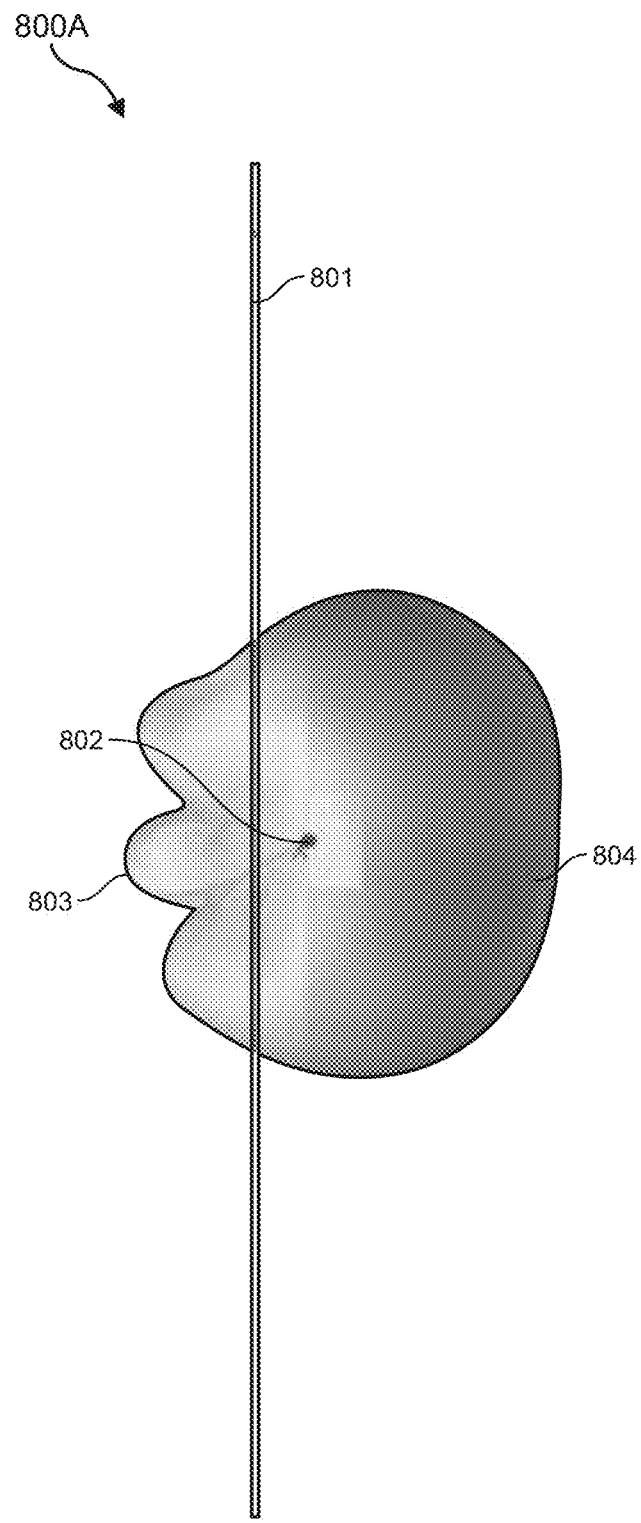
FIGS. 8A & 8B illustrate implementations of a magnetic dipole antenna that is positioned next to a conductive shield.
Figure 8B:
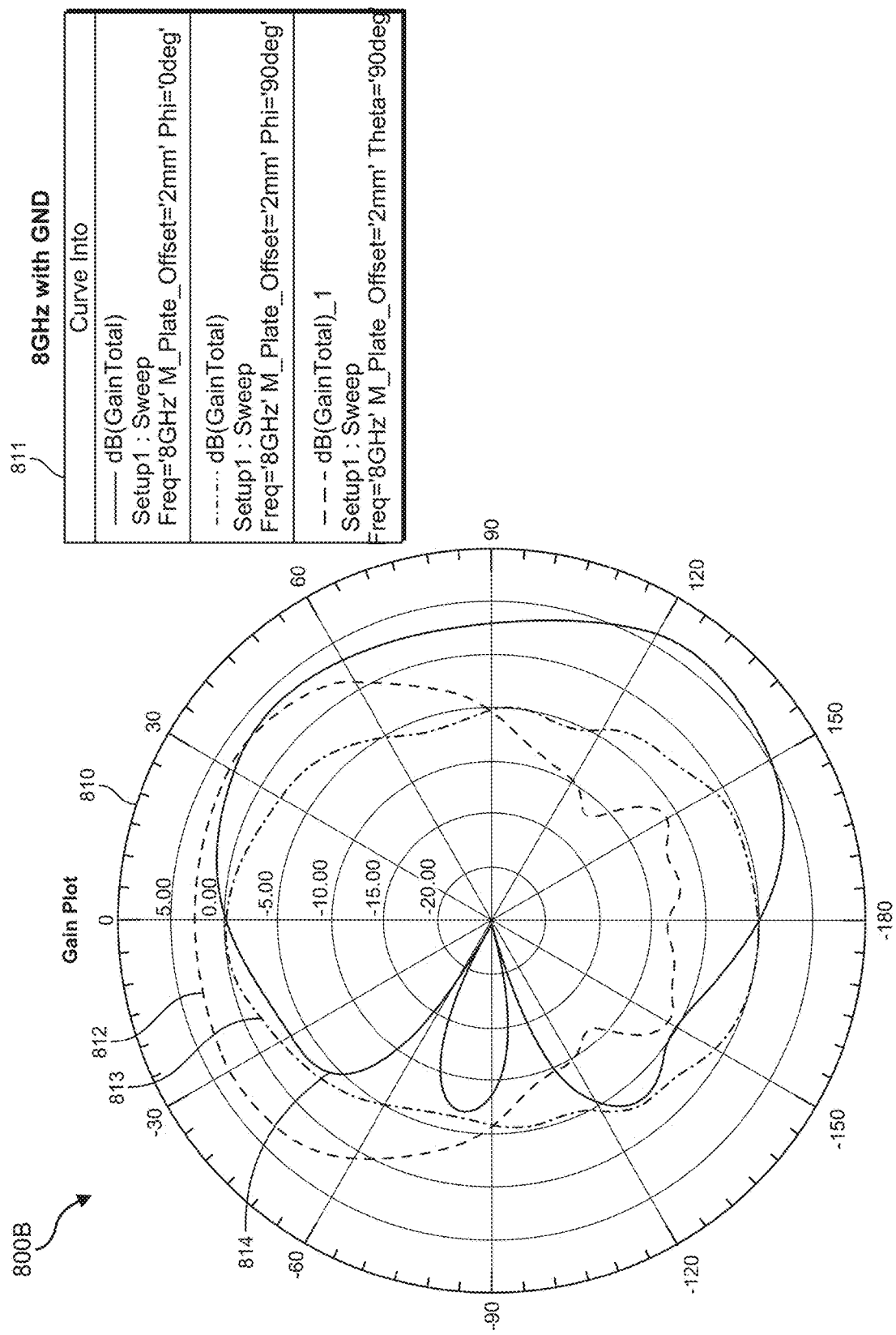

FIGS. 8A and 8B illustrate embodiments 800A/800B in which a magnetic dipole antenna 802 is implemented in proximity to a metal sheet 801. The magnetic dipole antenna 802 may be the same as or similar to the magnetic dipole antenna 701 of FIG. 7A. The metal sheet 801 may be a thermal sheet, a PCB, an electrical component, or other item that may interfere with the transmission or reception of electromagnetic radiation. The magnetic dipole antenna 802 may radiate strongly and with high total radiated power away from the metal sheet 801 (i.e., in direction 804). However, even despite the presence of the metal plate or metal sheet 801, the radiation pattern of the magnetic dipole antenna 802 may exhibit lesser but still strong total radiated power even behind the metal sheet 801. This may be due to the reduced directivity provided by the magnetic dipole antenna 802.

The gain plot 810 of FIG. 8B may illustrate the radiation pattern of FIG. 8A in plotted data 814. The plotted data 814 may represent an antenna sweep performed at 8 GHz along a given plane (e.g., Theta=90 deg). The plotted data 813 may represent a sweep performed at 8 GHz along a plane of Phi=90 deg, and plotted data 812 may represent a sweep performed at 8 GHz along a plane of Phi=0 deg (as indicated by key 811). Thus, as can be seen, the magnetic dipole antenna 802 may provide sufficient gain at 8 GHz to operate in a functional manner even in the presence of a metal sheet 801.

Figure 9A:
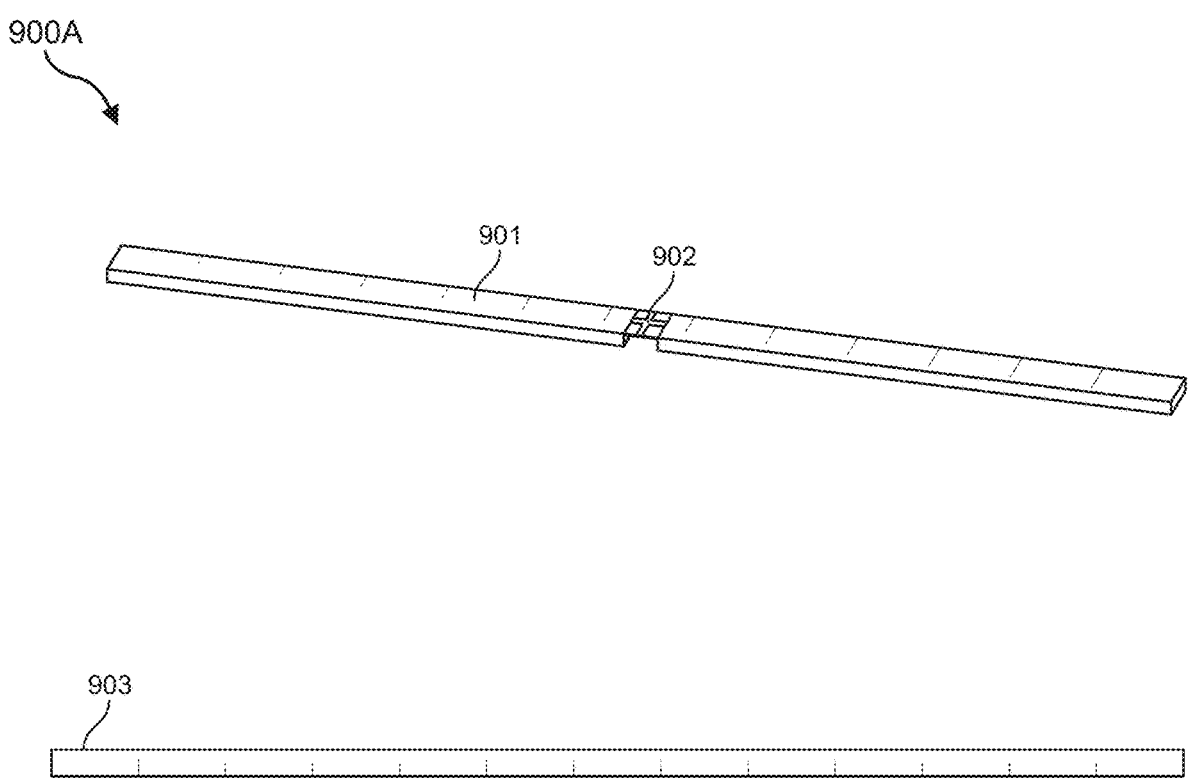
FIGS. 9A & 9B illustrate respective embodiments of electric and magnetic dipole antenna implementations.
Figure 9B:
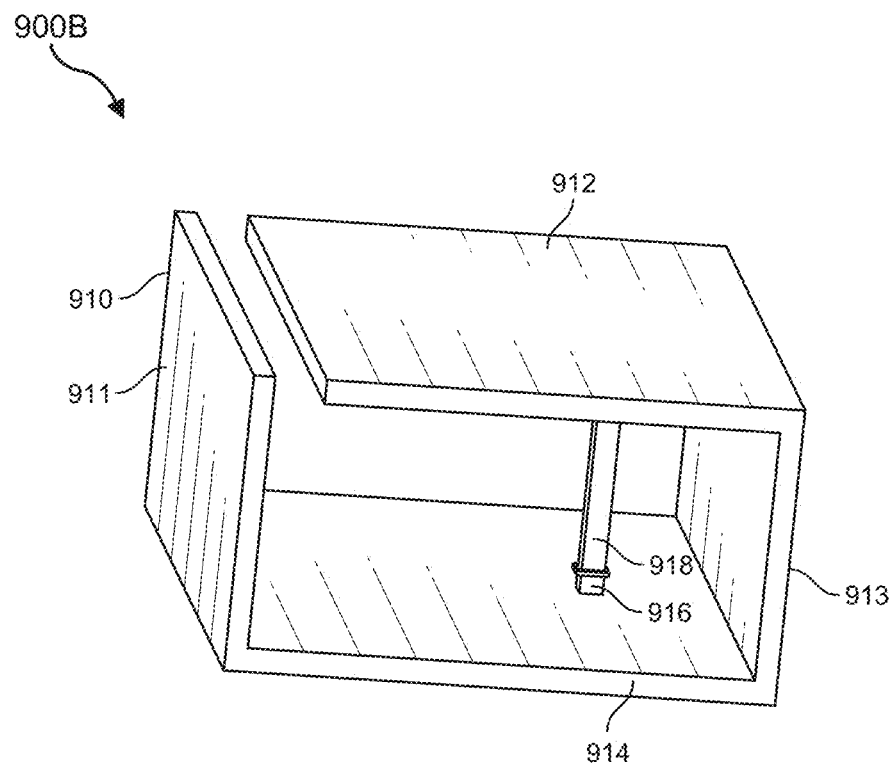
Figure 9B:
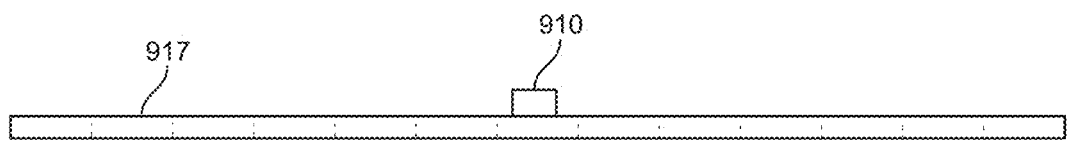

FIG. 9A illustrates an embodiment 900A that includes an electric dipole antenna 901. The electric dipole antenna 901 may include two portions fed by an antenna feed 902. To function properly at 8 GHz for example, the electric dipole antenna 901 may need to be relatively long. For instance, the electric dipole antenna 901 may need to be 15 mm long or more. And, the electric dipole antenna 901 may need to maintain at least a 5 mm distance between its radiating elements and any metal plates, PCBs, thermal sheets, etc., as shown at 903. In contrast to the electric dipole antenna 901, the magnetic dipole antenna 910 of embodiment 900B of FIG. 9B may be much shorter (e.g., 5 mm as opposed to 15 mm). Indeed, the magnetic dipole antenna 910 may be, at least in some embodiments, 5 mm long by 4 mm wide by 3 mm high. The magnetic dipole antenna 910 may have a capacitive gap of 0.4 mm between radiating portions 911 and 912.

Still further, the radiating portion 912 may be linked to radiating portion 914 by means of an electrically conductive via 918 having an antenna feed 916. In this embodiment, the side portions 911 and 913 may be the same height, while radiating portions 912 and 914 may be of different lengths to provide the 0.4 mm gap. In this embodiment, the magnetic dipole antenna 910 may be positioned immediately next to a metal plate 917 or may be positioned further away from the metal plate 917. In cases where the magnetic dipole antenna 910 abuts a metal plate, the reduced directivity provided by the magnetic dipole antenna may allow the antenna to work at high enough efficiency to continue operating in a functional manner.

Figure 10A:
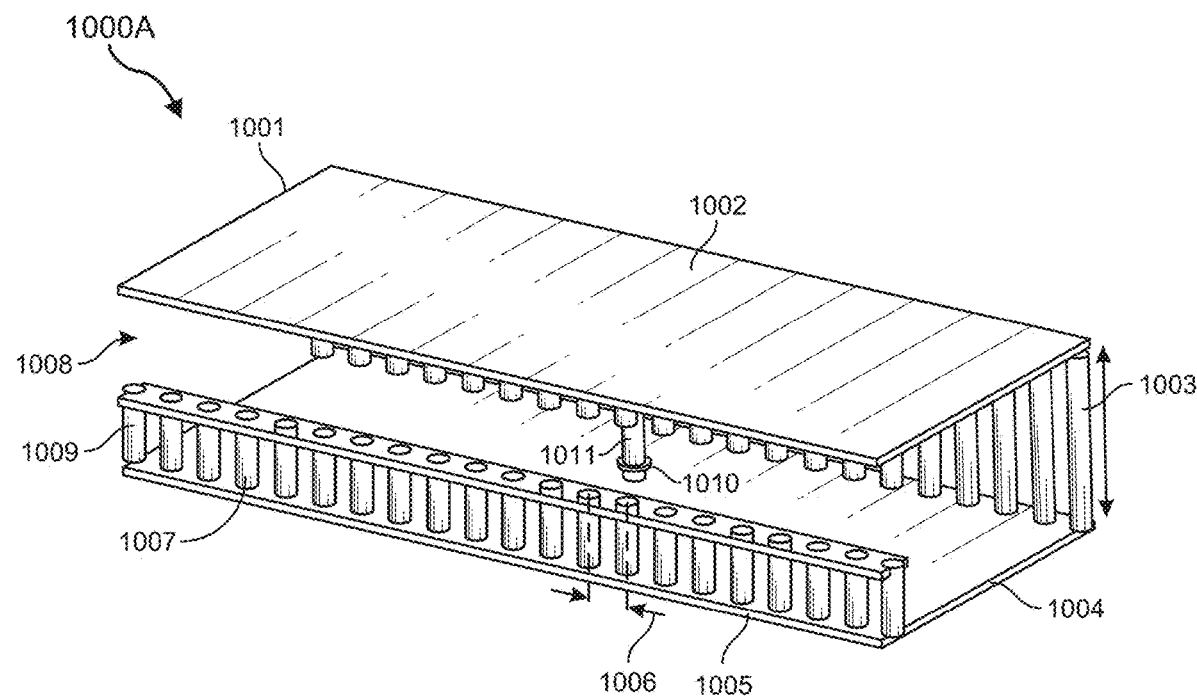
FIGS. 10A-10C illustrate embodiments of a magnetic dipole antenna disposed on a printed circuit board (PCB).
Figure 10B:
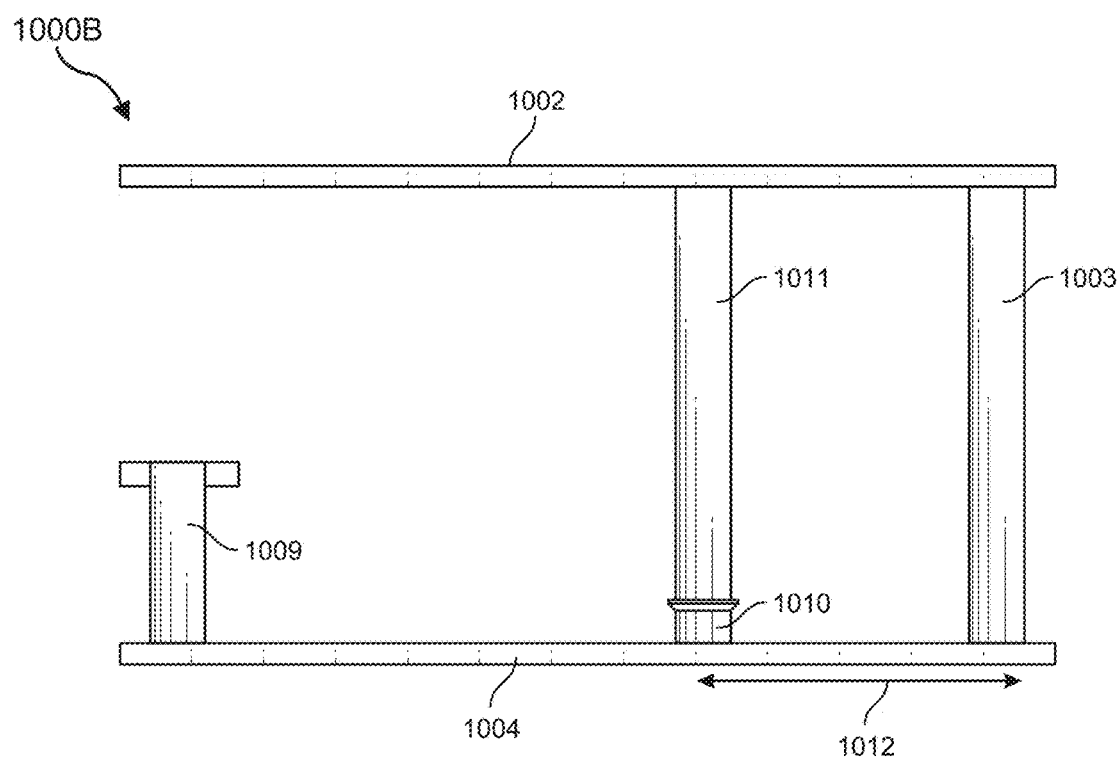
Figure 10C:
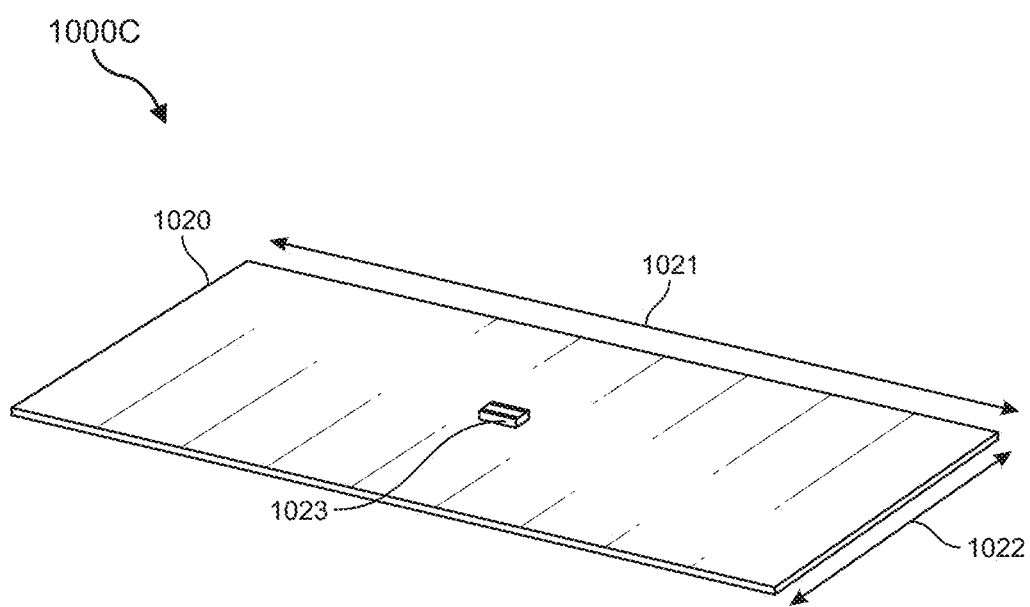
Figure 11:
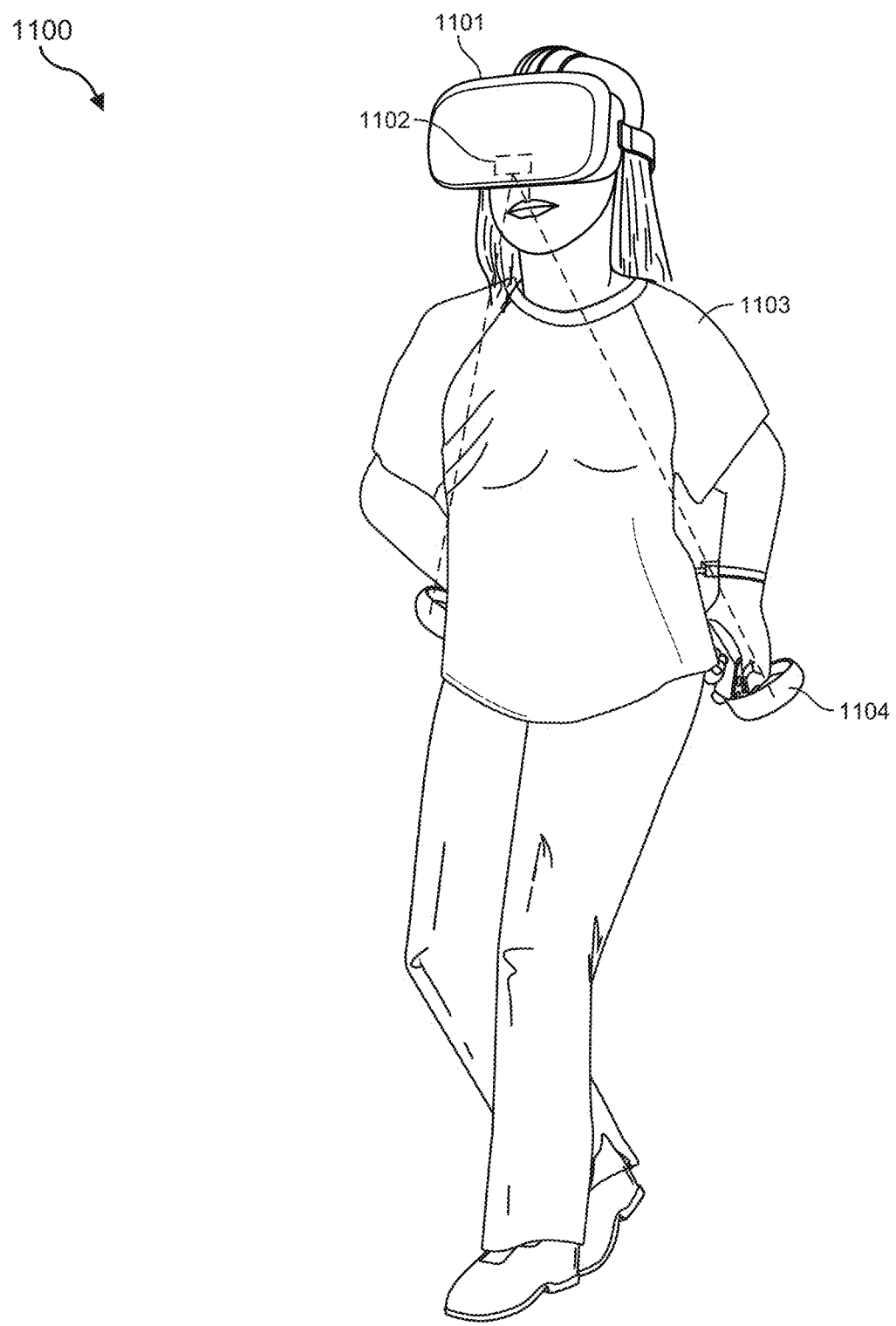
FIG. 11 illustrates an embodiment in which a magnetic dipole antenna is incorporated in a wearable device is implemented by a user to communicate with one or more peripheral devices.

FIGS. 10A-10C illustrate embodiments 1000A-1000C in which a PCB version of a magnetic dipole antenna may be provided. In embodiment 1000A of FIG. 10A, for example, a magnetic dipole antenna designed for implementation on a printed circuit board (PCB) (e.g., a "PCB magnetic dipole antenna") may include multiple small loop antennas melded or fastened together. Indeed, the PCB magnetic dipole antenna 1001 may include a plurality of small loop antennas, where each small loop antenna includes a top radiating portion 1002, a column 1003, a bottom radiating portion 1004, and a second, shorter column 1009. The small loops may be incomplete or open loops that include a gap 1008. The gap may span between the shorter column 1009 and the top radiating portion 1002. As shown in FIG. 10A, a single PCB magnetic dipole antenna may include 10, 15, 20, or more small loop antennas fused together. In some cases, these fused small loop antennas may form a solid plate (e.g., 1002 and/or 1005). In some embodiments, the solid plates (e.g., radiating portions 1002 and 1005) may be joined by an electrically conductive via 1011 that, itself, includes an antenna feed 1010. In some cases, the dimensions of the PCB magnetic dipole antenna 1001 may be 10 mm long by 4 mm wide by 2 mm high, with a via spacing 1006 of 0.5 mm, a via diameter 1007 of 0.25 mm, and a gap length of 1 mm. Other dimensions are also possible.

Embodiment 1000B of FIG. 10B illustrates a single small loop antenna with a top radiating portion 1002, a longer column 1003, a shorter column 1009, and a bottom radiating portion 1004. In some cases, the top radiating portion 1002 may be linked to the bottom radiating portion 1004 with an electrically conductive via 1011 having an antenna feed 1010. As can be seen in FIG. 10B, the electrically conductive via 1011 may be positioned a prescribed distance 1012 away from the larger column 1003. This distance may provide sufficient isolation for the radiating portions 1002, 1003, 1004, and 1009 to operate in their intended manner, providing a vertically polarizing flow of current. This may provide an omnidirectional radiation pattern that may function similarly in most or all directions. Embodiment 1000C of FIG. 10C illustrates a PCB magnetic dipole antenna 1023 arranged on a substrate 1020 such as a silicon wafer. The substrate 1020 may be made of substantially any length 1021 or width 1022, and may hold substantially any number of PCB magnetic dipole antennas 1023.

In some embodiments, the PCB magnetic dipole antenna 1001 of FIG. 10A and/or the magnetic dipole antenna 101 of FIG. 1A may be implemented on a wireless mobile device such as a virtual reality HMD. For instance, in embodiment 1100 of FIG. 11, a user 1103 may be wearing a virtual reality HMD 1101. The virtual reality HMD 1101 may include one or more magnetic dipole antennas 1102. The magnetic dipole antenna 1102 may be the same as or different than magnetic dipole antenna 101 of FIG. 1A and may include a conductive gap between radiating elements that causes the antenna to operate with reduced directivity, reduced path loss, and/or increased gain. The magnetic dipole antenna 1102 within the VR HMD 1101 may communicate with local wireless devices including controller 1104. In this embodiment, the controllers 1104 may be positioned behind the user 1103. As such, the magnetic dipole antenna 1102 may establish a cross-body link to the controllers. This cross-body link may travel through the user's body and may still provide sufficient radiated power to send signals to and receive signals from the wireless controllers 1104.

Additionally or alternatively, the magnetic dipole antenna 1102 may form additional cross-body links with other wireless devices in the user's environment including internet of things devices, smartwatches, smartphones, artificial reality glasses, laptop or tablet computers, or embedded systems. In such cases, the communication between the VR HMD 1101 and the handheld controller 1104 (or other device) may be a cross-body link that travels through at least some part of the user's body. The cross-body link formed by the radiating elements and the electrically conductive via of the magnetic dipole antenna 1102 may provide a vertical radiation field relative to the user's body. This vertical radiation field may be designed to travel through the user's body more efficiently, exhibiting less attenuation, and retaining more of its signal strength along the path to the peripheral devices.

Figure 12:
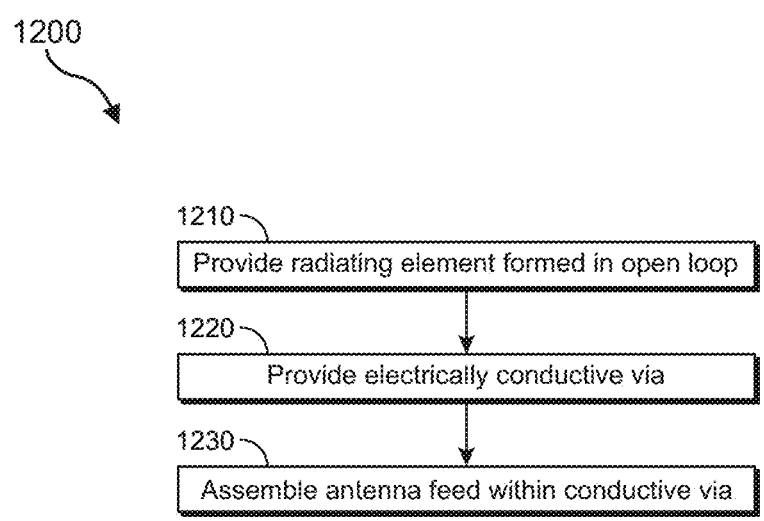
FIG. 12 is a flow diagram of an exemplary method for manufacturing a wearable electronic device having a magnetic dipole antenna.

FIG. 12 is a flow diagram of an exemplary method of manufacturing 1200 for assembling or producing a magnetic dipole antenna. The steps shown in FIG. 12 may be performed by any suitable piece of industrial equipment or industrial machines. These industrial machines may be operated according to computer-executable code and/or computing systems, including embedded computing systems. In one example, each of the steps shown in FIG. 12 may represent an algorithm whose structure includes and/or is represented by multiple sub-steps, examples of which will be provided in greater detail below.

As illustrated in FIG. 12, at step 1210, one or more manufacturing systems, machines, or equipment may assemble, generate, or otherwise provide a radiating element formed in an open loop that includes at least first and second portions that are positioned opposite each other (e.g., 210 and 208 of FIG. 2B). At step 1220, the systems herein may provide an electrically conductive via 204 that connects the first and second opposing portions of the radiating element. At step 1230, these systems may assemble an antenna feed 205 within the electrically conductive via 204. In some cases, the first portion of the radiating side portion 210 may be shorter in length than the second, opposite portion of the radiating side portion 208. And, at least in some cases, the difference in length between the first and second portions of the radiating element may form a capacitive gap (e.g., 203) across the radiating element.

In some embodiments, as shown in FIG. 10A, a radiating element may be formed from multiple open loop antennas arranged in parallel with each other. This plurality of open loop antennas may be linked together via a conductive material such as copper or other metal. The conjoined small loop antennas may be disposed on a substrate such as a printed circuit board. That printed circuit board may then be incorporated into many different types of mobile electronic devices.

Accordingly, in this manner, the embodiments described herein may provide magnetic dipole antennas that show a reduced directivity, reduced path loss, and improved gain when compared to electric dipole antennas. Moreover, the magnetic dipole antennas described herein may be smaller than electric dipole antennas and, as such, may be placed in more locations within an electronic device. Still further, because of the reduced directivity of the magnetic dipole antennas described herein, the magnetic dipoles may be placed adjacent to or very close to metal sheets, thermal sheets, or other potentially interfering components and still provide a minimum required antenna efficiency.

EXAMPLE EMBODIMENTS

Example 1: A magnetic dipole antenna may include a radiating element formed in an open loop that includes at least first and second portions that are positioned opposite each other, an electrically conductive via connecting the first and second opposing portions of the radiating element, and an antenna feed disposed within the electrically conductive via. The first portion of the radiating element may be shorter in length than the second, opposite portion of the radiating element, and the difference in length between the first and second portions of the radiating element may form a capacitive gap across the radiating element.

Example 2: The magnetic dipole antenna of Example 1, wherein the radiating element is rectangular, having third and fourth portions that are arranged opposite each other and parallel to the electrically conductive via.

Example 3: The magnetic dipole antenna of either Example 1 or Example 2, wherein the rectangular radiating element comprises a plurality of small loop antennas melded together.

Example 4: The magnetic dipole antenna of any of Examples 1-3, wherein the rectangular radiating element includes a longer side and a shorter side, and wherein the capacitive gap formed across the radiating element is on the shorter side of rectangle.

Example 5: The magnetic dipole antenna of any of Examples 1-4, wherein the rectangular radiating element includes a longer side and a shorter side, and wherein the capacitive gap formed across the radiating element is on the longer side of rectangle.

Example 6: The magnetic dipole antenna of any of Examples 1-5, wherein the radiating element is positioned next to at least one of a printed circuit board (PCB) or a thermal shield.

Example 7: The magnetic dipole antenna of any of Examples 1-6, wherein the first and second opposite portions of the radiating element are linked via by the electrically conductive via and at least a first row of electrically conductive vias.

Example 8: The magnetic dipole antenna of any of Examples 1-7, wherein the first and second opposite portions of the radiating element are linked via by the electrically conductive via, the first row of electrically conductive vias, and a second row of electrically conductive vias, wherein the second row of electrically conductive vias is shorter than the first row of electrically conductive vias.

Example 9: The magnetic dipole antenna of any of Examples 1-8, wherein the shorter second row of electrically conductive vias forms a gap between the first portion of the radiating element and the second row of electrically conductive vias.

Example 10: The magnetic dipole antenna of any of Examples 1-9, wherein each of the electrically conductive vias of the second row of electrically conductive vias are linked to each other via conductive material.

Example 11: A system may include a radiating element formed in an open loop that includes at least first and second portions that are positioned opposite each other, an electrically conductive via connecting the first and second opposing portions of the radiating element, and an antenna feed disposed within the electrically conductive via. The first portion of the radiating element is shorter in length than the second, opposite portion of the radiating element, and wherein the difference in length between the first and second portions of the radiating element forms a capacitive gap across the radiating element.

Example 12: The system of Example 11, wherein the radiating element, the electrically conductive via, and the antenna feed are disposed within at least one mobile electronic device.

Example 13: The system of either Example 11 or Example 12, wherein the at least one mobile electronic device comprises a head-mounted display device.

Example 14: The system of any of Examples 11-13, wherein the at least one mobile electronic device comprises a head-mounted display device and a handheld controller.

Example 15: The system of any of Examples 11-14, wherein the radiating element, the electrically conductive via, and the antenna feed facilitate communication between the head-mounted display and the handheld controller.

Example 16: The system of any of Examples 11-15, wherein the communication between the head-mounted display and the handheld controller comprises a cross-body link that travels through at least a portion of a user's body.

Example 17: The system of any of Examples 11-16, wherein the radiating element and the electrically conductive via form a vertical radiation field relative to the user's body.

Example 18: A method of manufacturing may include providing a radiating element formed in an open loop that includes at least first and second portions that are positioned opposite each other, providing an electrically conductive via that connects the first and second opposing portions of the radiating element, and assembling an antenna feed within the electrically conductive via. The first portion of the radiating element is shorter in length than the second, opposite portion of the radiating element, and wherein the difference in length between the first and second portions of the radiating element forms a capacitive gap across the radiating element.

Example 19: The method of manufacturing of Example 18, wherein the radiating element is formed from a plurality of open loop antennas arranged in parallel with each other.

Example 20: The method of manufacturing of either Example 18 or Example 19, wherein the radiating element, the electrically conductive via, and the antenna feed are arranged on a printed circuit board.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 13:
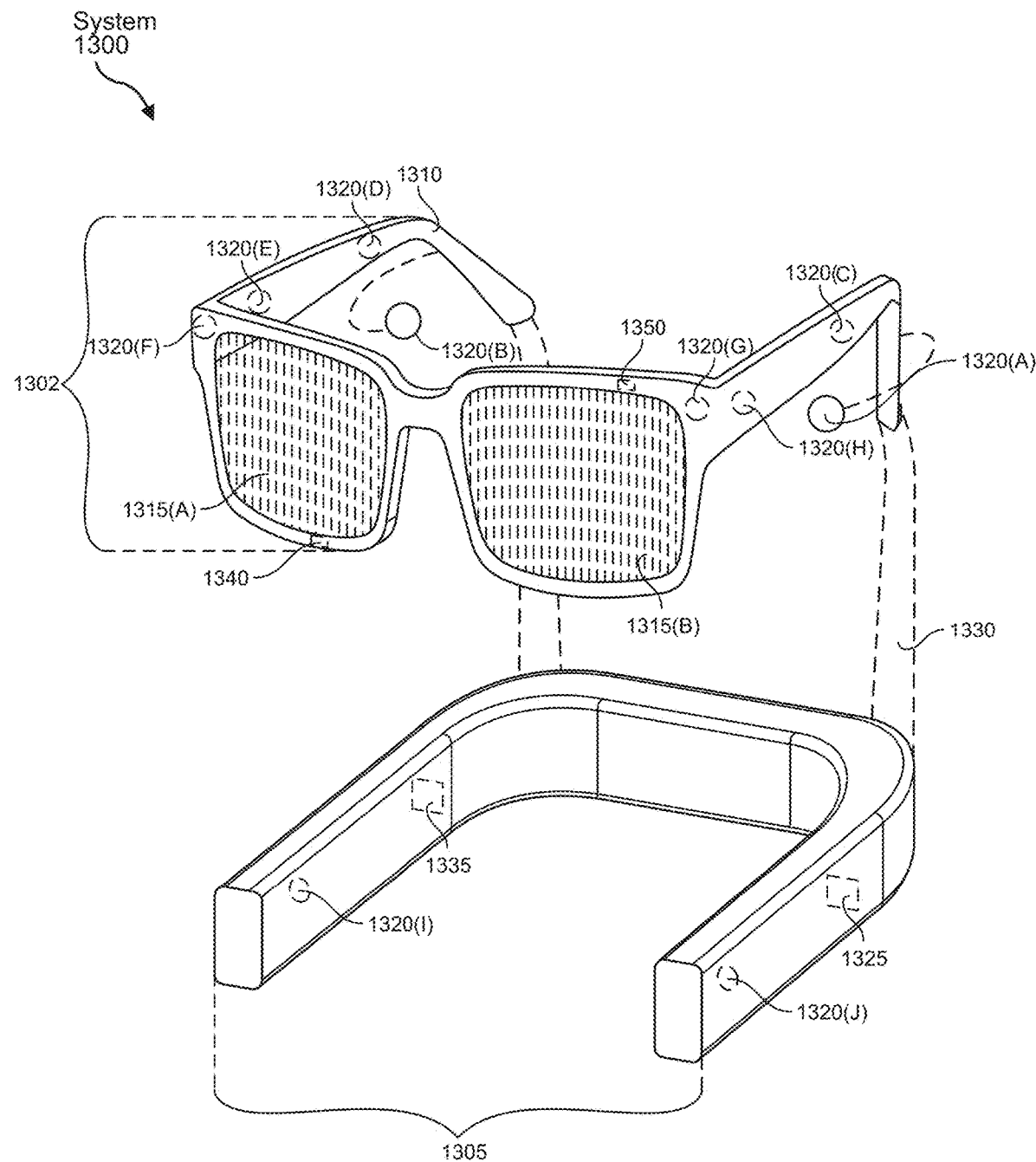
FIG. 13 is an illustration of exemplary augmented-reality glasses that may be used in connection with embodiments of this disclosure.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 13 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(I) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality system 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light projector (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1300 and 1400 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 15:
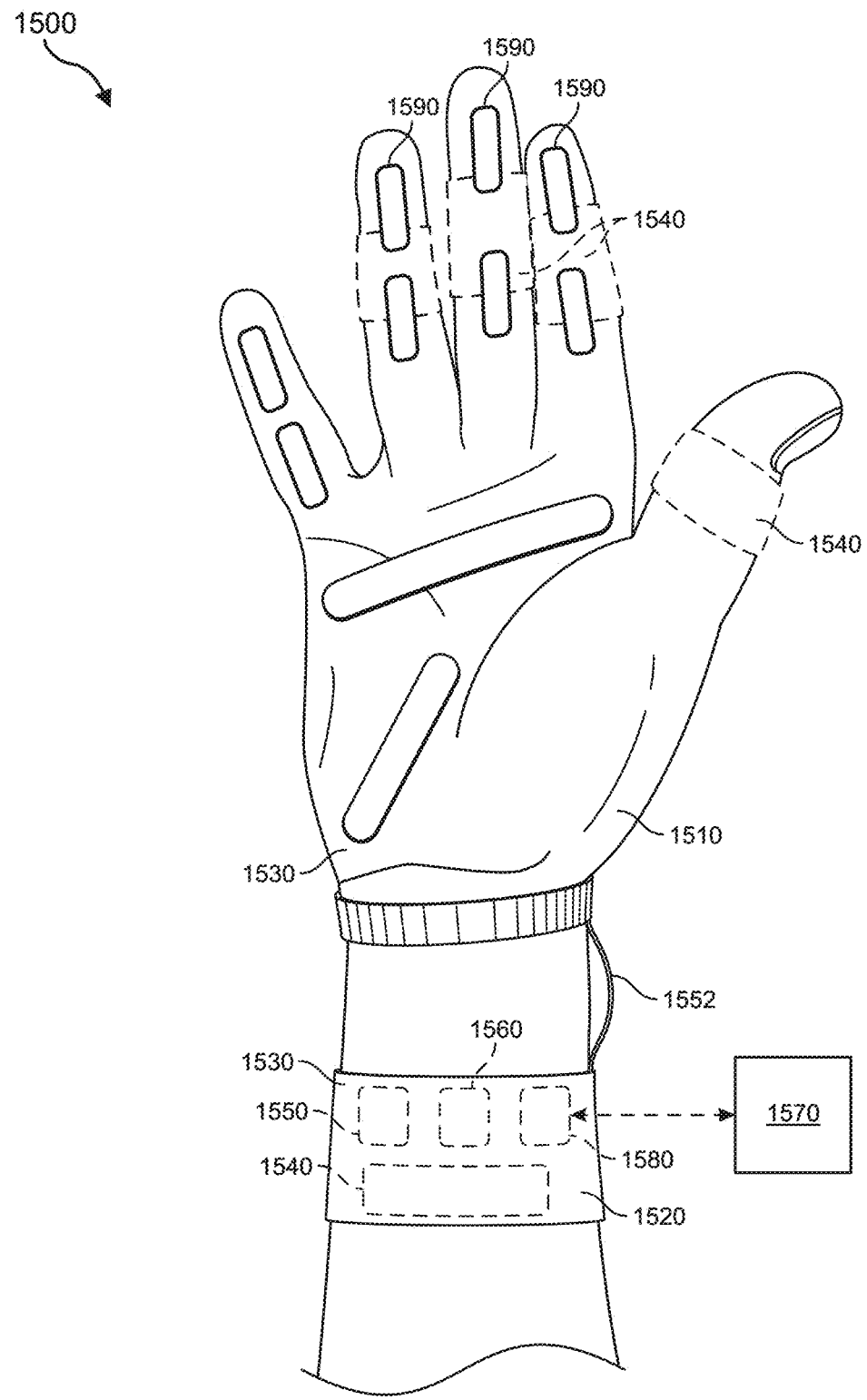
FIG. 15 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 15 illustrates a vibrotactile system 1500 in the form of a wearable glove (haptic device 1510) and wristband (haptic device 1520). Haptic device 1510 and haptic device 1520 are shown as examples of wearable devices that include a flexible, wearable textile material 1530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1540 may be positioned at least partially within one or more corresponding pockets formed in textile material 1530 of vibrotactile system 1500. Vibrotactile devices 1540 may be positioned in locations to provide a vibrating sensation (e.g., haptic feedback) to a user of vibrotactile system 1500. For example, vibrotactile devices 1540 may be positioned against the user's finger(s), thumb, or wrist, as shown in FIG. 15. Vibrotactile devices 1540 may, in some examples, be sufficiently flexible to conform to or bend with the user's corresponding body part(s).

A power source 1550 (e.g., a battery) for applying a voltage to the vibrotactile devices 1540 for activation thereof may be electrically coupled to vibrotactile devices 1540, such as via conductive wiring 1552. In some examples, each of vibrotactile devices 1540 may be independently electrically coupled to power source 1550 for individual activation. In some embodiments, a processor 1560 may be operatively coupled to power source 1550 and configured (e.g., programmed) to control activation of vibrotactile devices 1540.

Vibrotactile system 1500 may be implemented in a variety of ways. In some examples, vibrotactile system 1500 may be a standalone system with integral subsystems and components for operation independent of other devices and systems. As another example, vibrotactile system 1500 may be configured for interaction with another device or system 1570. For example, vibrotactile system 1500 may, in some examples, include a communications interface 1580 for receiving and/or sending signals to the other device or system 1570. The other device or system 1570 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1580 may enable communications between vibrotactile system 1500 and the other device or system 1570 via a wireless (e.g., Wi-Fi, BLUETOOTH, cellular, radio, etc.) link or a wired link. If present, communications interface 1580 may be in communication with processor 1560, such as to provide a signal to processor 1560 to activate or deactivate one or more of the vibrotactile devices 1540.

Vibrotactile system 1500 may optionally include other subsystems and components, such as touch-sensitive pads 1590, pressure sensors, motion sensors, position sensors, lighting elements, and/or user interface elements (e.g., an on/off button, a vibration control element, etc.). During use, vibrotactile devices 1540 may be configured to be activated for a variety of different reasons, such as in response to the user's interaction with user interface elements, a signal from the motion or position sensors, a signal from the touch-sensitive pads 1590, a signal from the pressure sensors, a signal from the other device or system 1570, etc.

Although power source 1550, processor 1560, and communications interface 1580 are illustrated in FIG. 15 as being positioned in haptic device 1520, the present disclosure is not so limited. For example, one or more of power source 1550, processor 1560, or communications interface 1580 may be positioned within haptic device 1510 or within another wearable textile.

Figure 16:
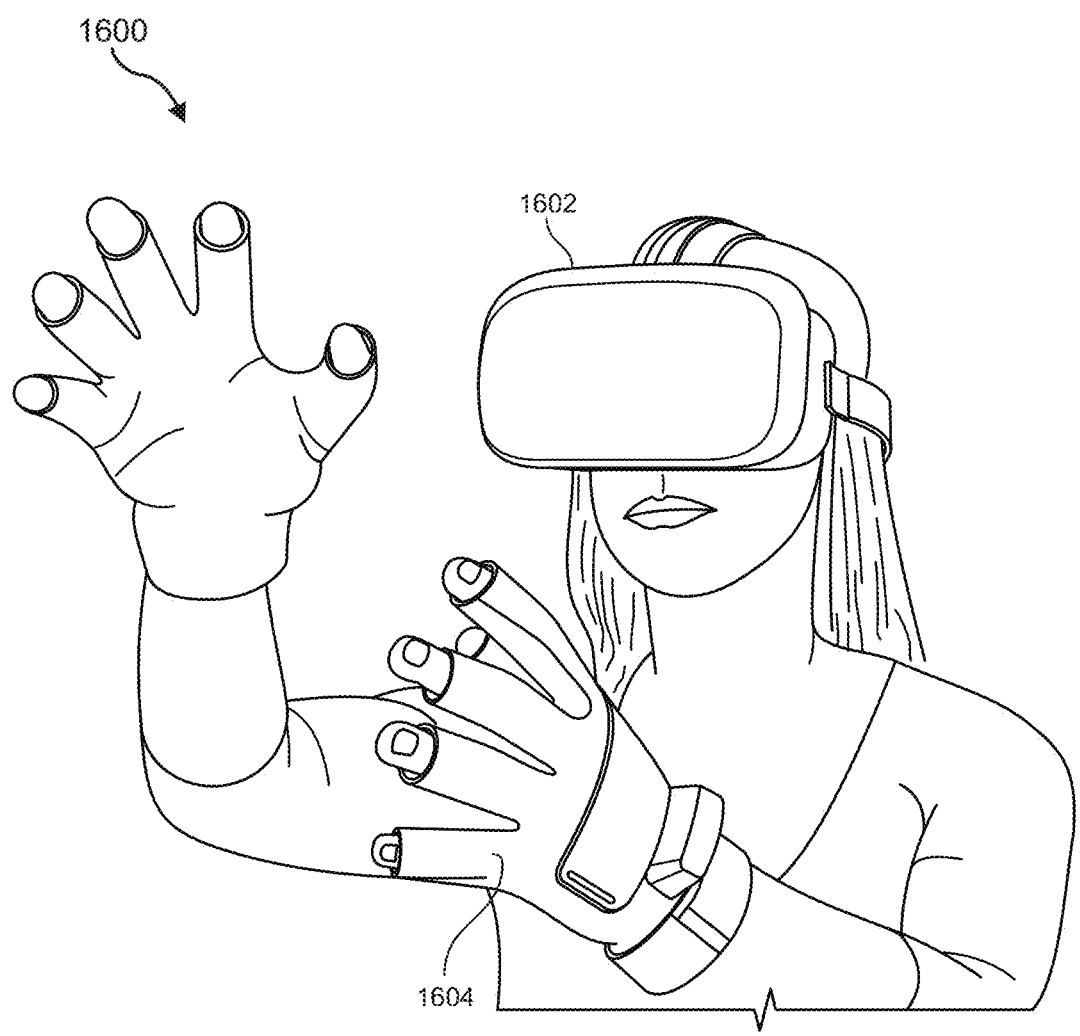
FIG. 16 is an illustration of an exemplary virtual-reality environment according to embodiments of this disclosure.

Haptic wearables, such as those shown in and described in connection with FIG. 15, may be implemented in a variety of types of artificial-reality systems and environments. FIG. 16 shows an example artificial-reality environment 1600 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 14:
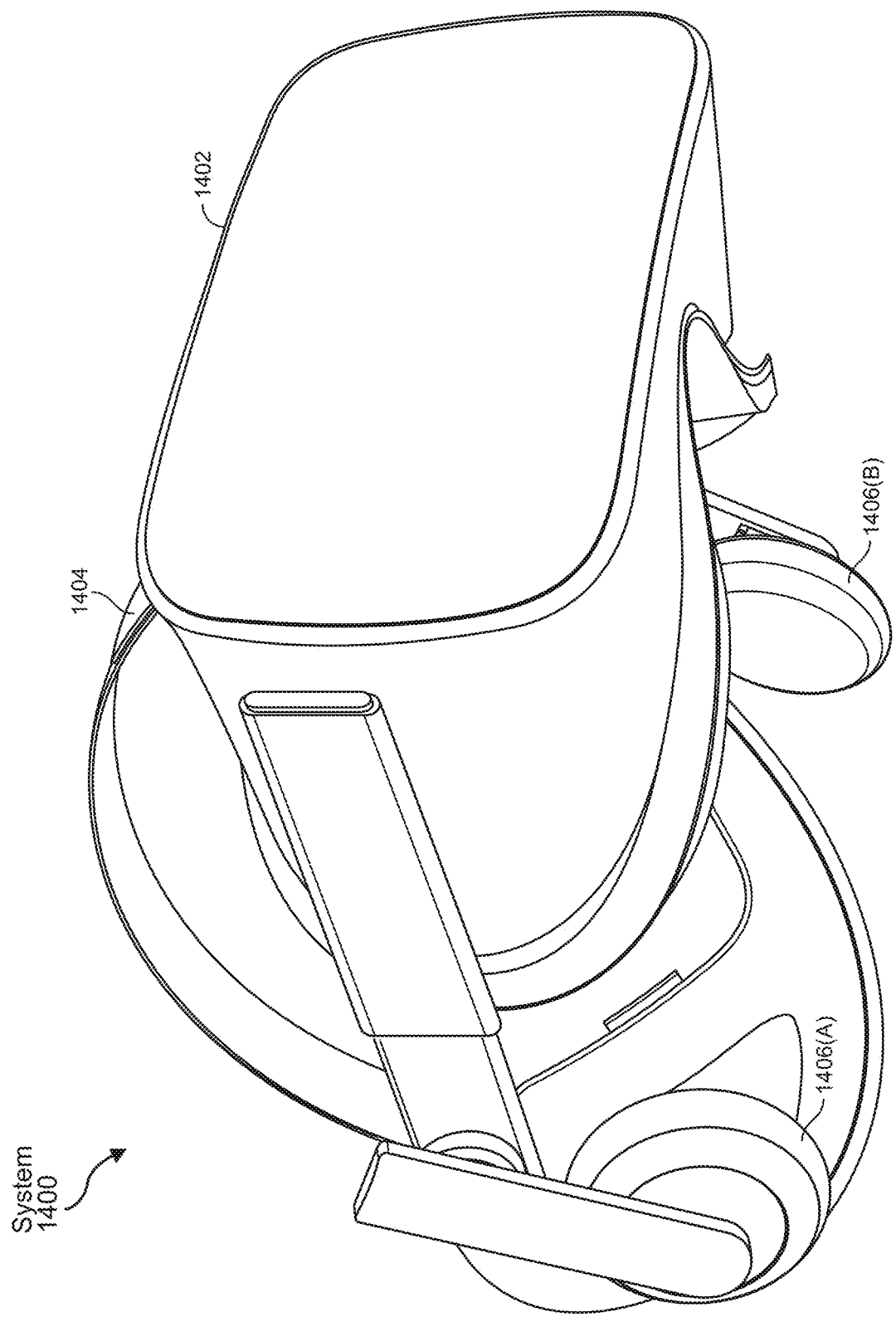
FIG. 14 is an illustration of an exemplary virtual-reality headset that may be used in connection with embodiments of this disclosure.

Head-mounted display 1602 generally represents any type or form of virtual-reality system, such as virtual-reality system 1400 in FIG. 14. Haptic device 1604 generally represents any type or form of wearable device, worn by a user of an artificial-reality system, that provides haptic feedback to the user to give the user the perception that he or she is physically engaging with a virtual object. In some embodiments, haptic device 1604 may provide haptic feedback by applying vibration, motion, and/or force to the user. For example, haptic device 1604 may limit or augment a user's movement. To give a specific example, haptic device 1604 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1604 to send action requests to a console. Examples of action requests include, without limitation, requests to start an application and/or end the application and/or requests to perform a particular action within the application.

Figure 17:
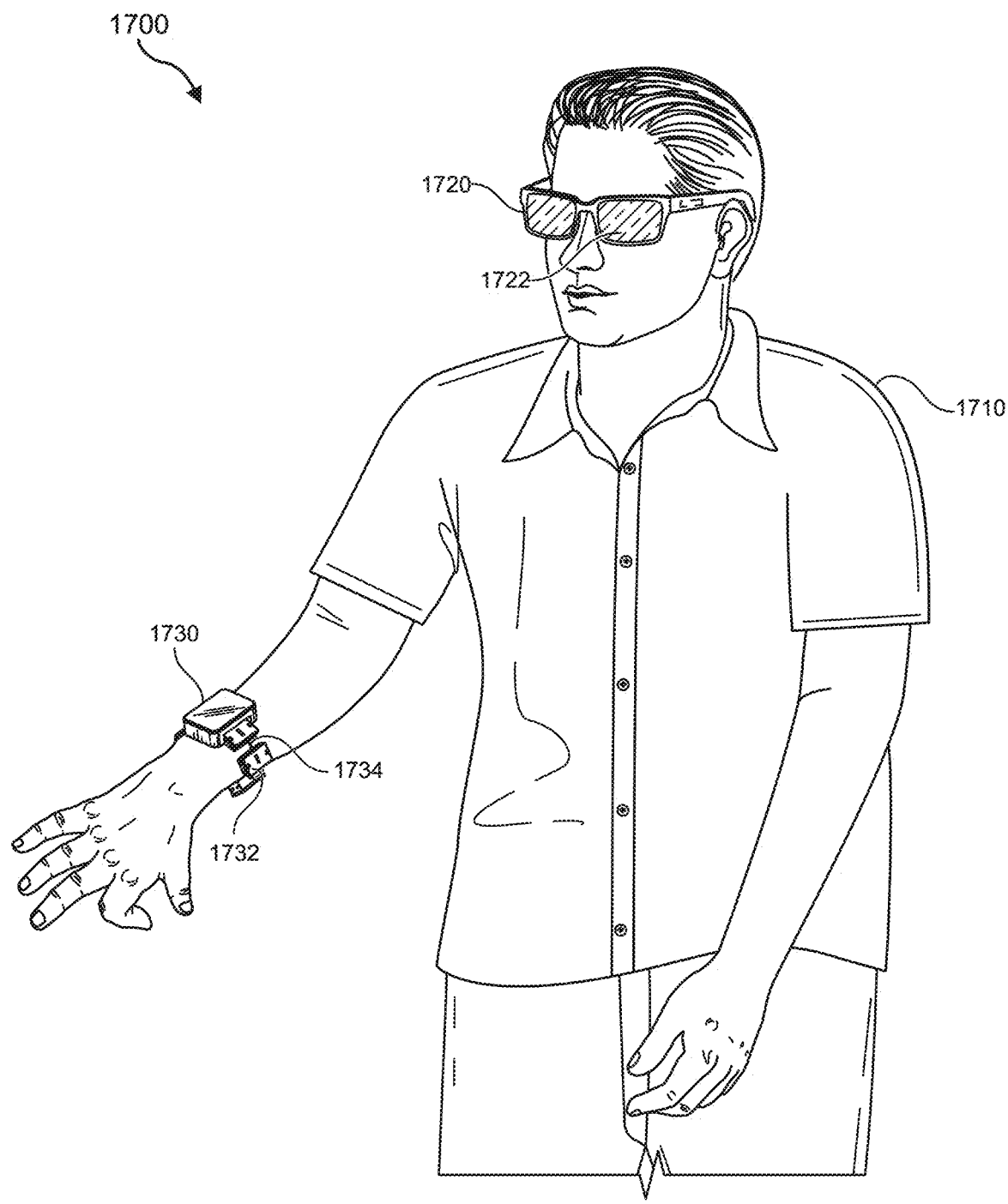
FIG. 17 is an illustration of an exemplary augmented-reality environment according to embodiments of this disclosure.

While haptic interfaces may be used with virtual-reality systems, as shown in FIG. 16, haptic interfaces may also be used with augmented-reality systems, as shown in FIG. 17. FIG. 17 is a perspective view of a user 1710 interacting with an augmented-reality system 1700. In this example, user 1710 may wear a pair of augmented-reality glasses 1720 that may have one or more displays 1722 and that are paired with a haptic device 1730. In this example, haptic device 1730 may be a wristband that includes a plurality of band elements 1732 and a tensioning mechanism 1734 that connects band elements 1732 to one another.

One or more of band elements 1732 may include any type or form of actuator suitable for providing haptic feedback. For example, one or more of band elements 1732 may be configured to provide one or more of various types of cutaneous feedback, including vibration, force, traction, texture, and/or temperature. To provide such feedback, band elements 1732 may include one or more of various types of actuators. In one example, each of band elements 1732 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1510, 1520, 1604, and 1730 may include any suitable number and/or type of haptic transducer, sensor, and/or feedback mechanism. For example, haptic devices 1510, 1520, 1604, and 1730 may include one or more mechanical transducers, piezoelectric transducers, and/or fluidic transducers. Haptic devices 1510, 1520, 1604, and 1730 may also include various combinations of different types and forms of transducers that work together or independently to enhance a user's artificial-reality experience. In one example, each of band elements 1732 of haptic device 1730 may include a vibrotactor (e.g., a vibrotactile actuator)

configured to vibrate in unison or independently to provide one or more of various types of haptic sensations to a user.

Figure 18A:
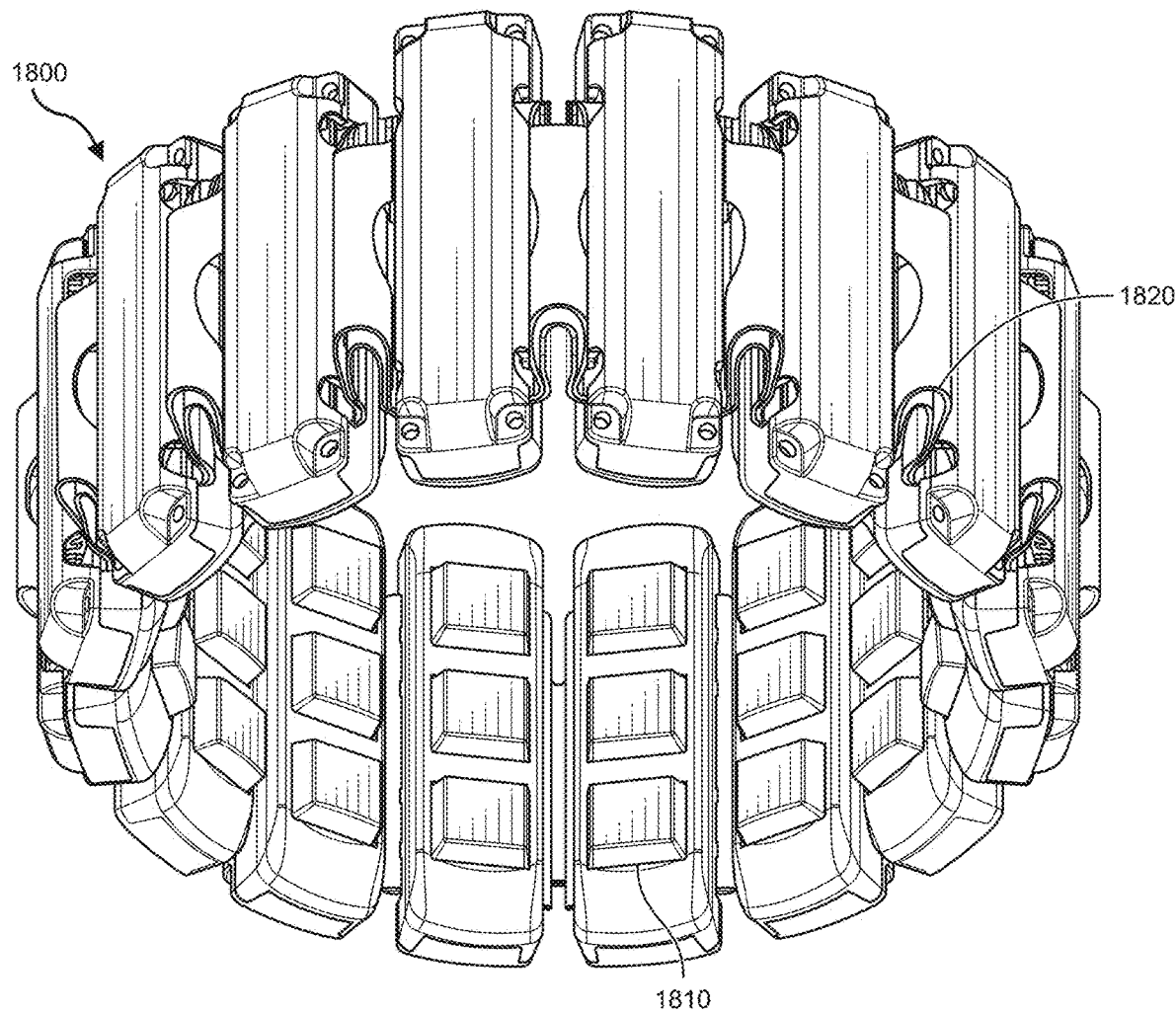
FIGS. 18A and 18B are illustrations of an exemplary human-machine interface configured to be worn around a user's lower arm or wrist.
Figure 18B:
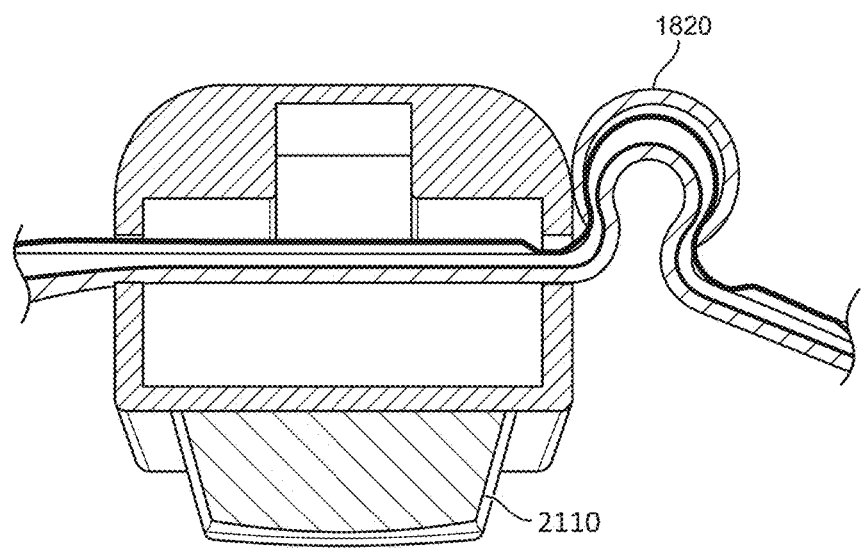

FIG. 18A illustrates an exemplary human-machine interface (also referred to herein as an EMG control interface) configured to be worn around a user's lower arm or wrist as a wearable system 1800. In this example, wearable system 1800 may include sixteen neuromuscular sensors 1810 (e.g., EMG sensors) arranged circumferentially around an elastic band 1820 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 18B illustrates a cross-sectional view through one of the sensors of the wearable device shown in FIG. 18A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1810 is discussed in more detail below with reference to FIGS. 19A and 19B.

FIGS. 19A and 19B illustrate an exemplary schematic diagram with internal components of a wearable system with EMG sensors. As shown, the wearable system may include a wearable portion 1910 (FIG. 19A) and a dongle portion 1920 (FIG. 19B) in communication with the wearable portion 1910 (e.g., via BLUETOOTH or another suitable wireless communication technology). As shown in FIG. 19A, the wearable portion 1910 may include skin contact electrodes 1911, examples of which are described in connection with FIGS. 18A and 18B. The output of the skin contact electrodes 1911 may be provided to analog front end 1930, which may be configured to perform analog processing (e.g., amplification, noise reduction, filtering, etc.) on the recorded signals. The processed analog signals may then be provided to analog-to-digital converter 1932, which may convert the analog signals to digital signals that can be processed by one or more computer processors. An example of a computer processor that may be used in accordance with some embodiments is microcontroller (MCU) 1934, illustrated in FIG. 19A. As shown, MCU 1934 may also include inputs from other sensors (e.g., IMU sensor 1940), and power and battery module 1942. The output of the processing performed by MCU 1934 may be provided to antenna 1950 for transmission to dongle portion 1920 shown in FIG. 19B.

Dongle portion 1920 may include antenna 1952, which may be configured to communicate with antenna 1950 included as part of wearable portion 1910. Communication between antennas 1950 and 1952 may occur using any suitable wireless technology and protocol, non-limiting examples of which include radiofrequency signaling and BLUETOOTH. As shown, the signals received by antenna 1952 of dongle portion 1920 may be provided to a host computer for further processing, display, and/or for effecting control of a particular physical or virtual object or objects.

Although the examples provided with reference to FIGS. 18A-18B and FIGS. 19A-19B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A magnetic dipole antenna comprising:
a radiating element formed in an open loop that includes at least first and second portions that are positioned opposite each other in a vertically non-overlapping manner;
an electrically conductive via directly, physically connecting the first and second opposing portions of the radiating element; and
an antenna feed disposed within the electrically conductive via,
wherein the first portion of the radiating element is shorter in length than the second, opposite portion of the radiating element, and
wherein the difference in length between the first and second portions of the radiating element forms a capacitive gap across the radiating element.

2. The magnetic dipole antenna of claim 1, wherein the radiating element is a rectangular radiating element, having third and fourth portions that are arranged opposite each other and parallel to the electrically conductive via.

3. The magnetic dipole antenna of claim 2, wherein the rectangular radiating element comprises a plurality of small loop antennas melded together, wherein each small loop antenna includes its own partial first, second, third, and fourth portions of the radiating element.

4. The magnetic dipole antenna of claim 2, wherein the rectangular radiating element includes a longer side and a shorter side, and wherein the capacitive gap formed across the radiating element is on the shorter side of rectangle.

5. The magnetic dipole antenna of claim 2, wherein the rectangular radiating element includes a longer side and a shorter side, and wherein the capacitive gap formed across the radiating element is on the longer side of rectangle.

6. The magnetic dipole antenna of claim 1, wherein the radiating element is positioned next to at least one of a printed circuit board (PCB) or a thermal shield.

7. The magnetic dipole antenna of claim 1, wherein the first and second opposite portions of the radiating element are linked via by the electrically conductive via and at least a first row of electrically conductive vias.

8. The magnetic dipole antenna of claim 7, wherein the first and second opposite portions of the radiating element are linked via by the electrically conductive via, the first row of electrically conductive vias, and a second row of electrically conductive vias, wherein the second row of electrically conductive vias is shorter than the first row of electrically conductive vias.

9. The magnetic dipole antenna of claim 8, wherein the shorter second row of electrically conductive vias forms a gap between the first portion of the radiating element and the second row of electrically conductive vias.

10. The magnetic dipole antenna of claim 9, wherein each of the electrically conductive vias of the second row of electrically conductive vias are linked to each other via conductive material.

11. A system comprising:
a radiating element formed in an open loop that includes at least first and second portions that are positioned opposite each other in a vertically non-overlapping manner;
an electrically conductive via directly, physically connecting the first and second opposing portions of the radiating element; and
an antenna feed disposed within the electrically conductive via,
wherein the first portion of the radiating element is shorter in length than the second, opposite portion of the radiating element, and
wherein the difference in length between the first and second portions of the radiating element forms a capacitive gap across the radiating element.

12. The system of claim 11, wherein the radiating element, the electrically conductive via, and the antenna feed are disposed within at least one mobile electronic device.

13. The system of claim 12, wherein the at least one mobile electronic device comprises a head-mounted display device.

14. The system of claim 12, wherein the at least one mobile electronic device comprises a head-mounted display device and a handheld controller.

15. The system of claim 14, wherein the radiating element, the electrically conductive via, and the antenna feed facilitate communication between the head-mounted display and the handheld controller.

16. The system of claim 15, wherein the communication between the head-mounted display and the handheld controller comprises a cross-body link that travels through at least a portion of a user's body.

17. The system of claim 16, wherein the radiating element and the electrically conductive via form a vertical radiation field relative to the user's body.

18. A method of manufacturing comprising:
providing a radiating element formed in an open loop that includes at least first and second portions that are positioned opposite each other in a vertically non-overlapping manner;
providing an electrically conductive via that directly, physically connects the first and second opposing portions of the radiating element; and
assembling an antenna feed within the electrically conductive via,
wherein the first portion of the radiating element is shorter in length than the second, opposite portion of the radiating element, and
wherein the difference in length between the first and second portions of the radiating element forms a capacitive gap across the radiating element.

19. The method of manufacturing of claim 18, wherein the radiating element is formed from a plurality of open loop antennas arranged in parallel with each other, wherein each of the plurality of open loop antennas includes its own partial first, second, third, and fourth portions of the radiating element.

20. The method of manufacturing of claim 18, wherein the radiating element, the electrically conductive via, and the antenna feed are arranged on a printed circuit board.

* * * * *